Oct. 21, 1958
J. G. BAKER
2,856,878
HYDROFOIL SYSTEM FOR BOATS
Filed Feb. 23, 1956
19 Sheets-Sheet 2
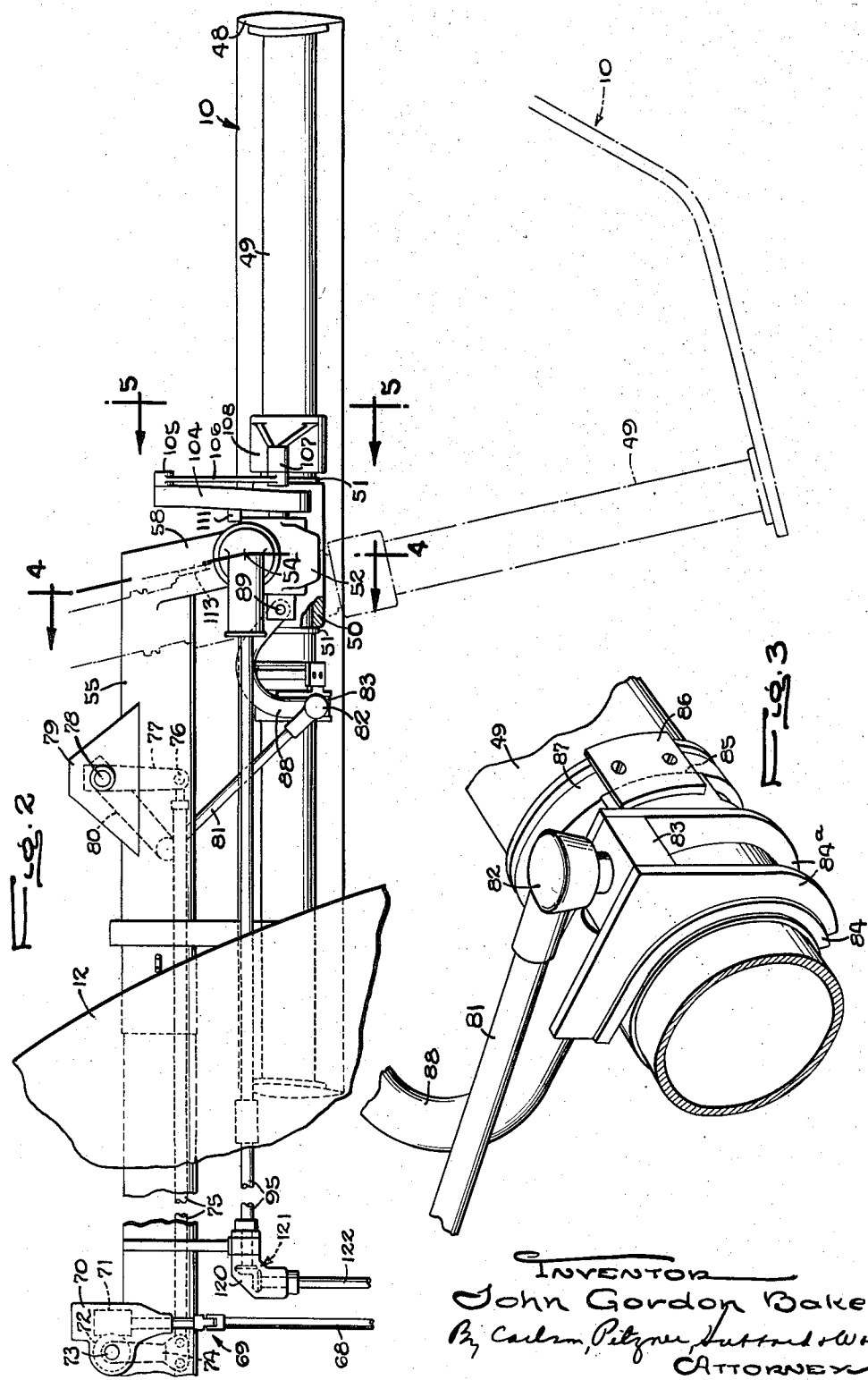
INVENTOR
John Gordon Baker
By Carlsen, Pitzner, Hubbard & Wolfe
ATTORNEY

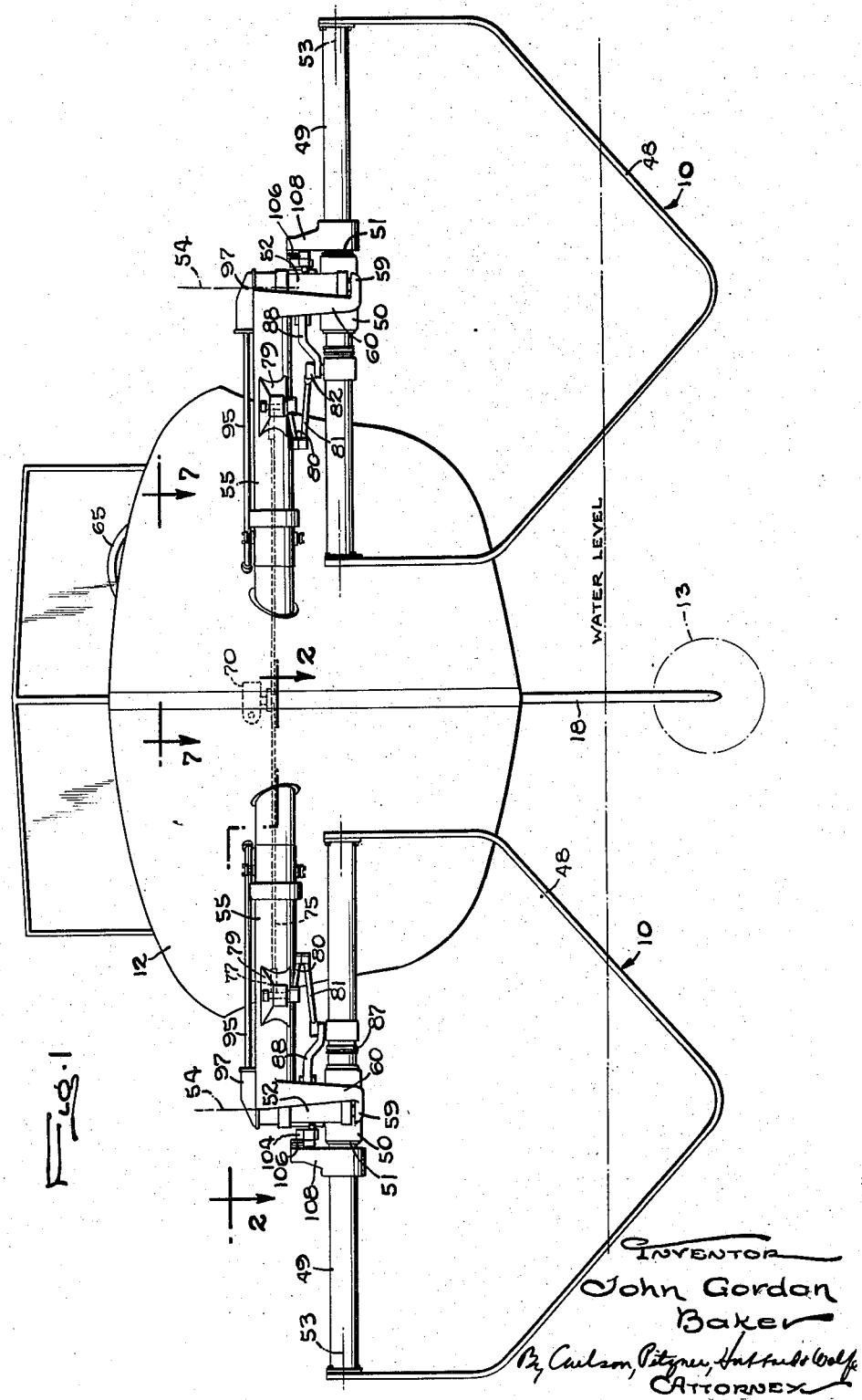

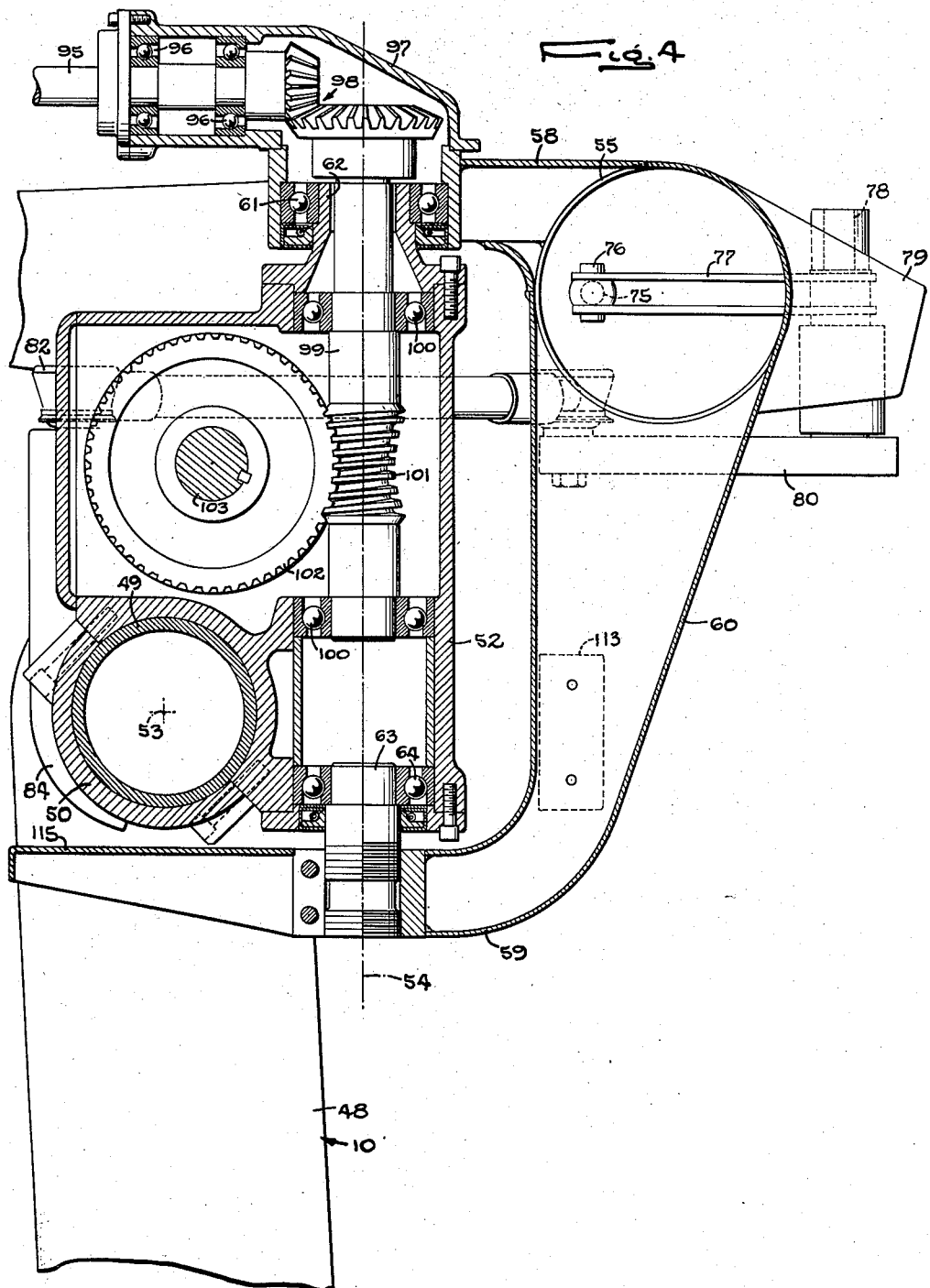

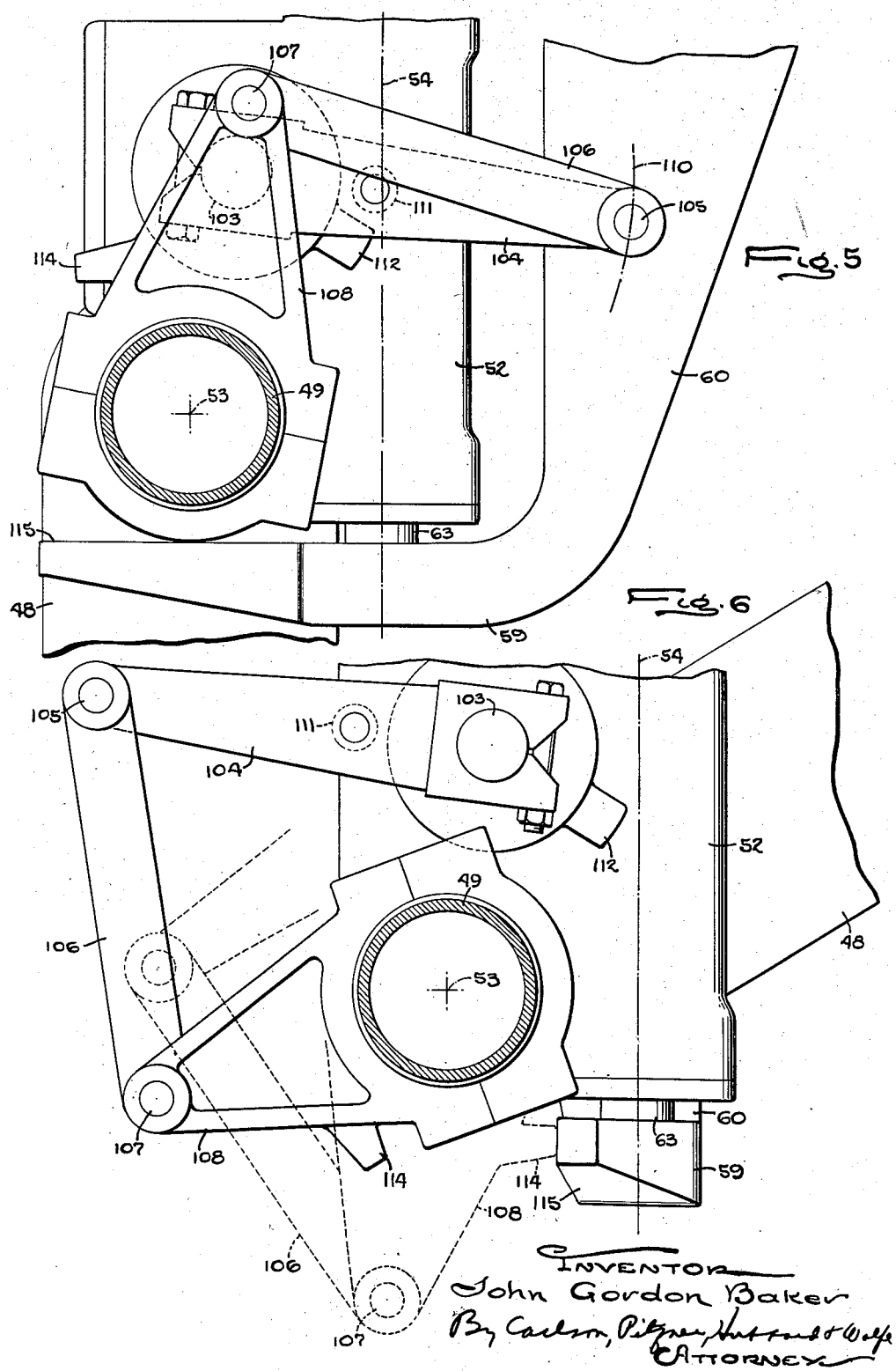

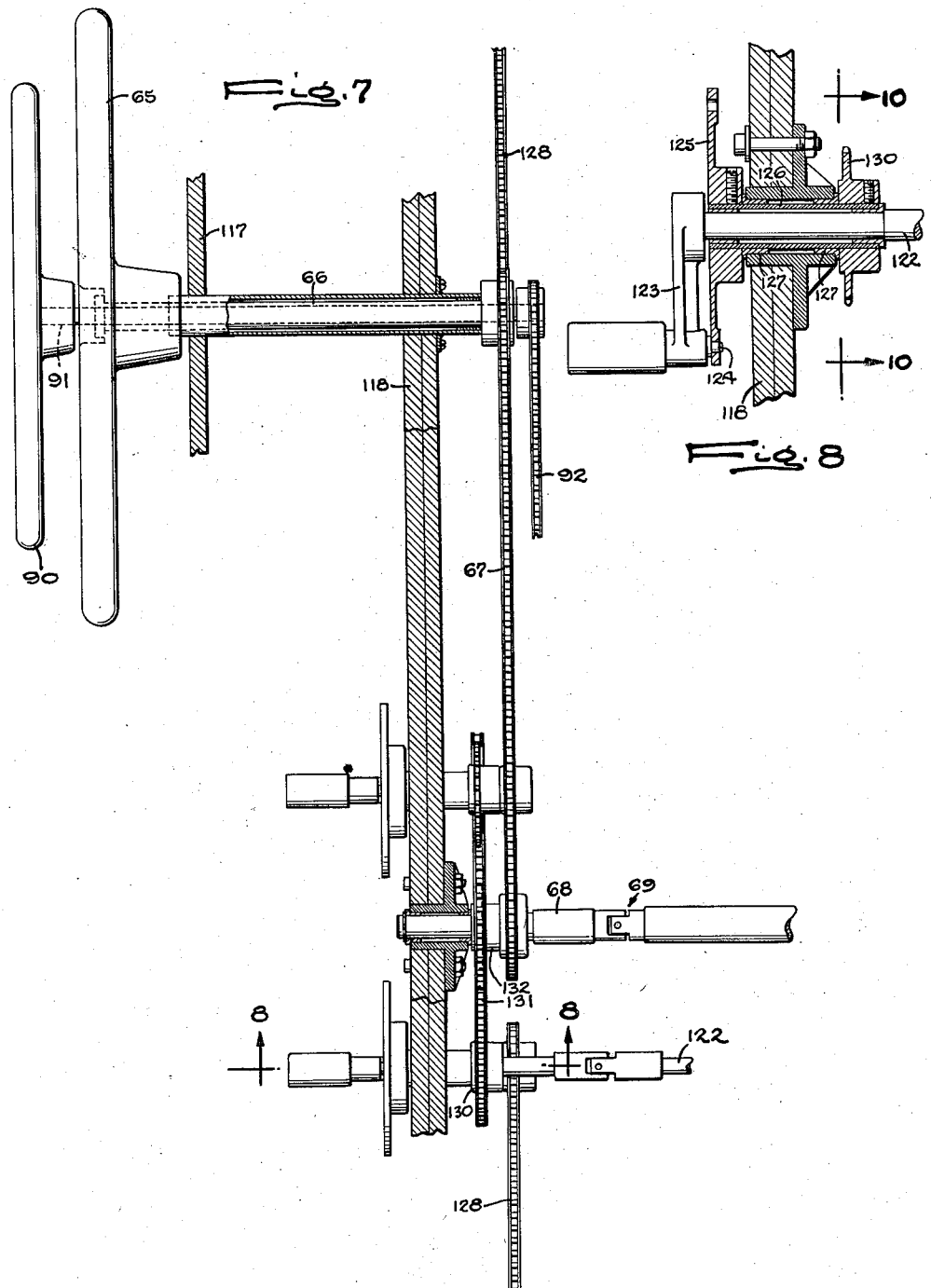

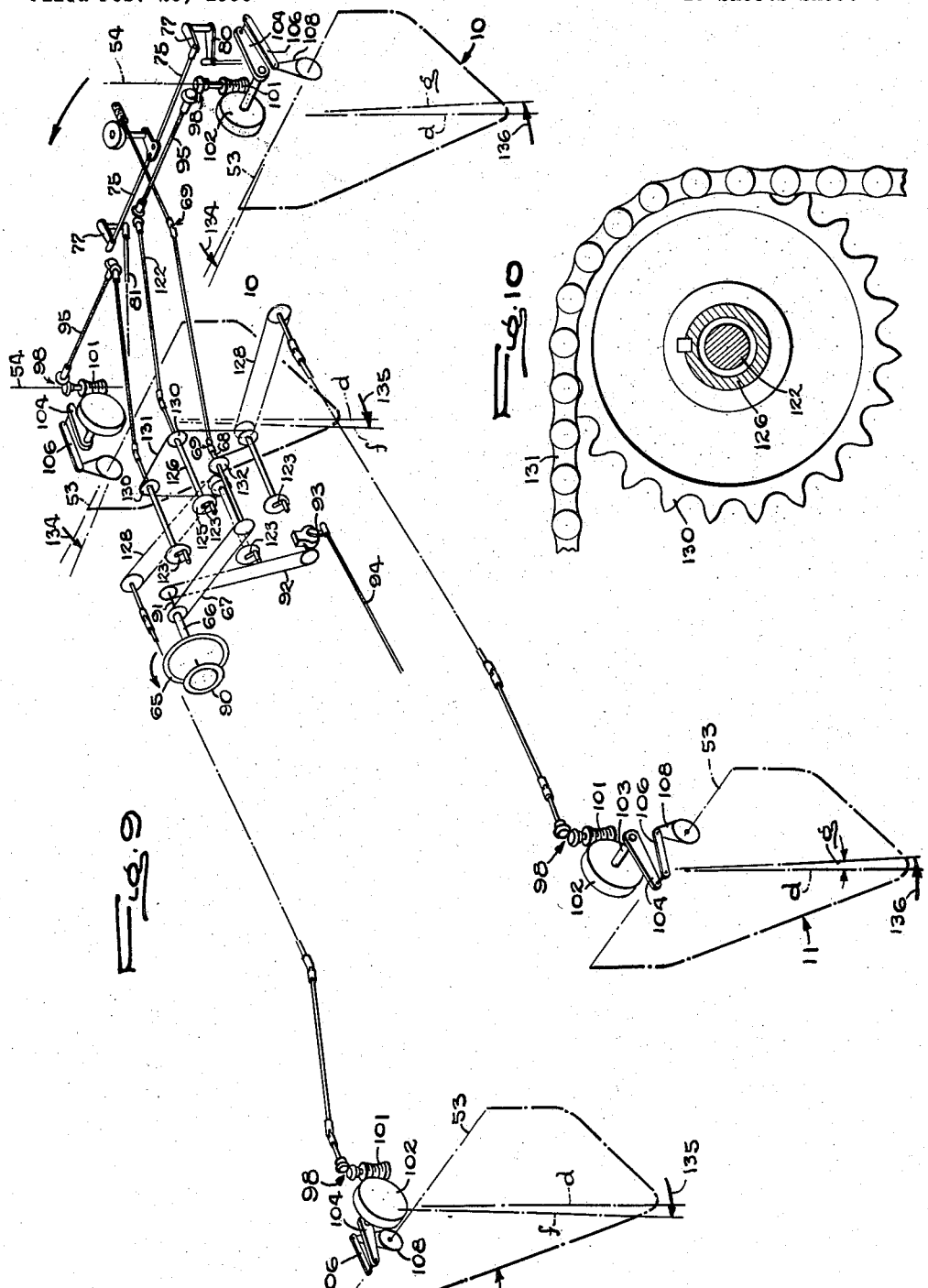

Oct. 21, 1958  J. G. BAKER  2,856,878
HYDROFOIL SYSTEM FOR BOATS
Filed Feb. 23, 1956  19 Sheets-Sheet 7
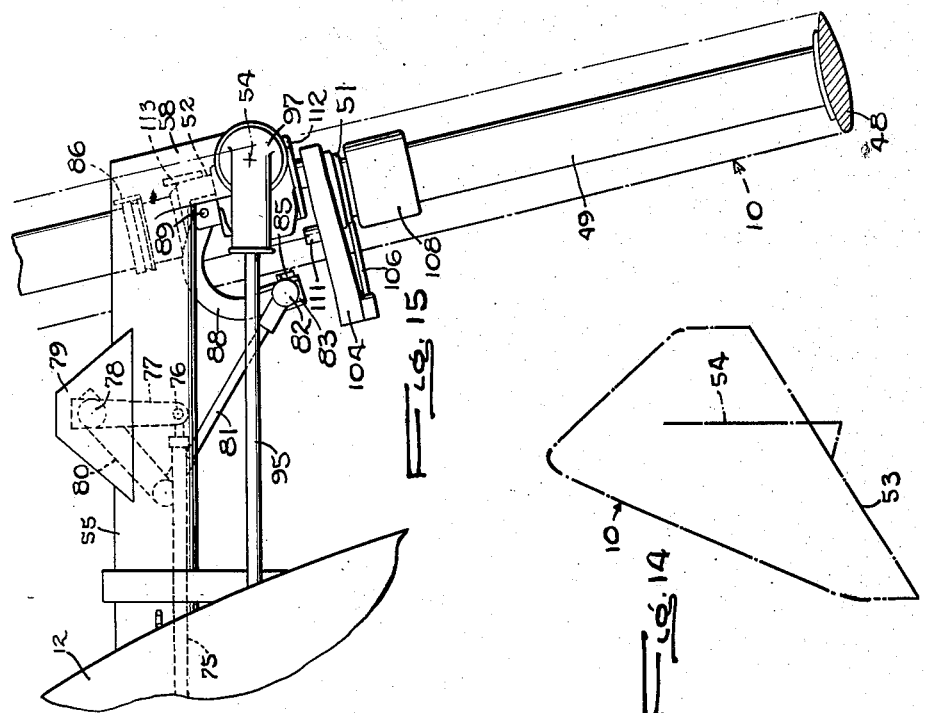
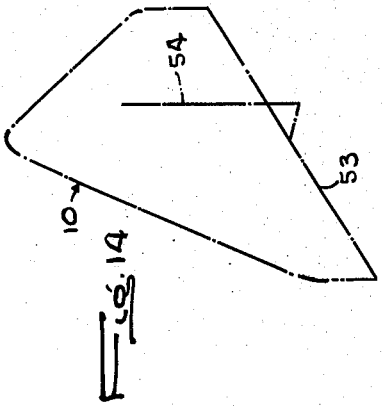
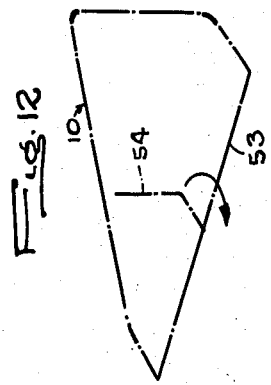
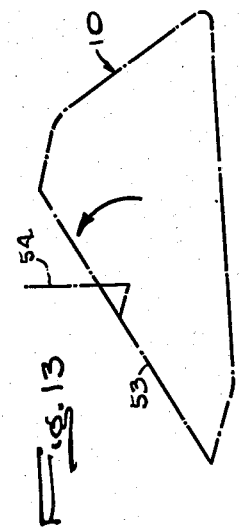
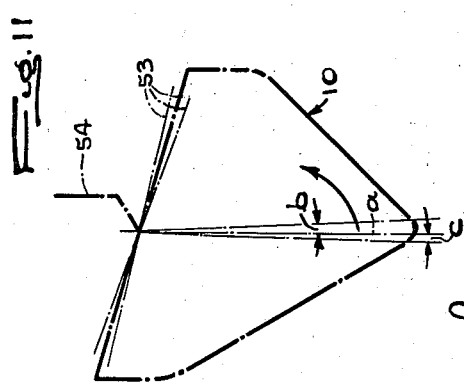

Oct. 21, 1958  J. G. BAKER  2,856,878
HYDROFOIL SYSTEM FOR BOATS
Filed Feb. 23, 1956  19 Sheets-Sheet 8
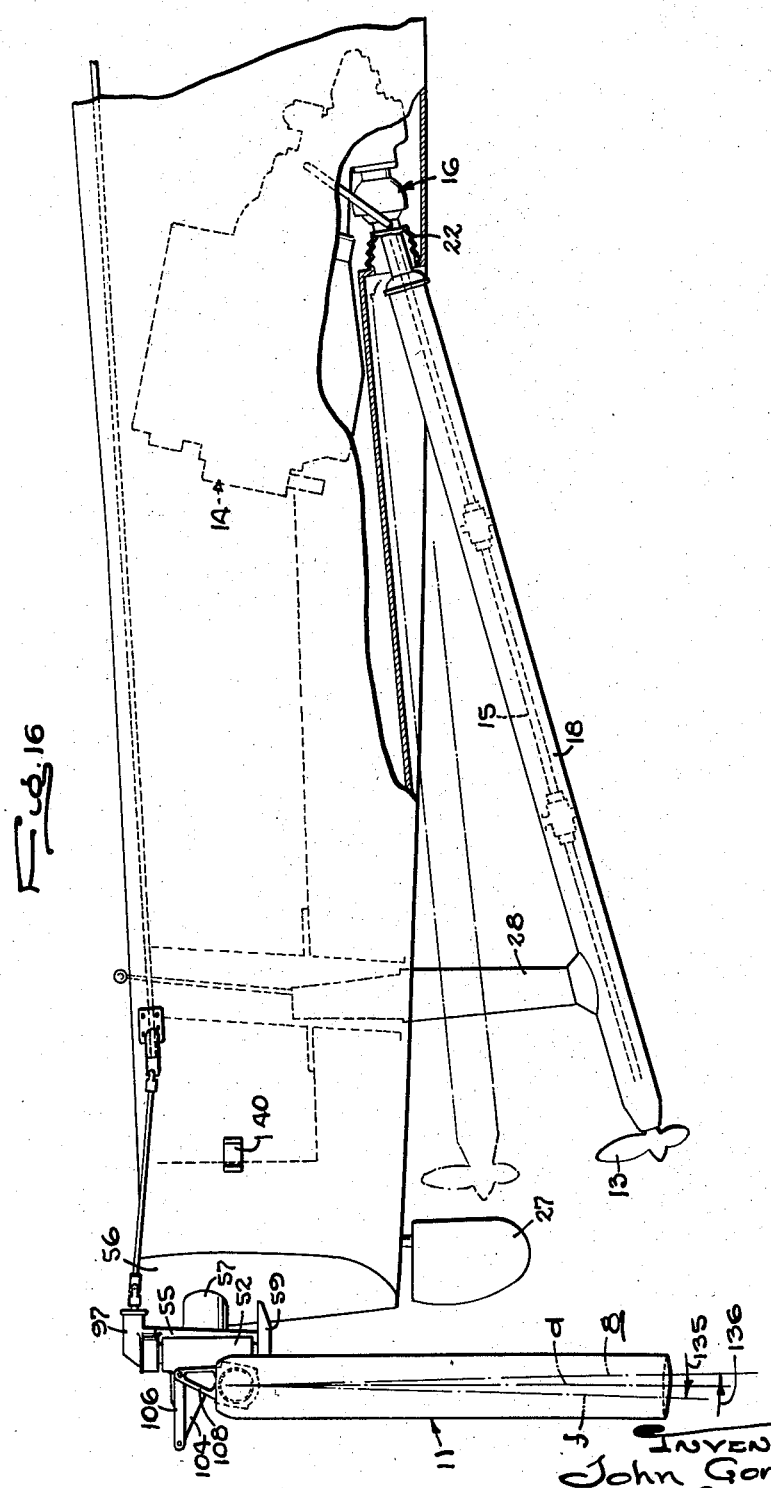

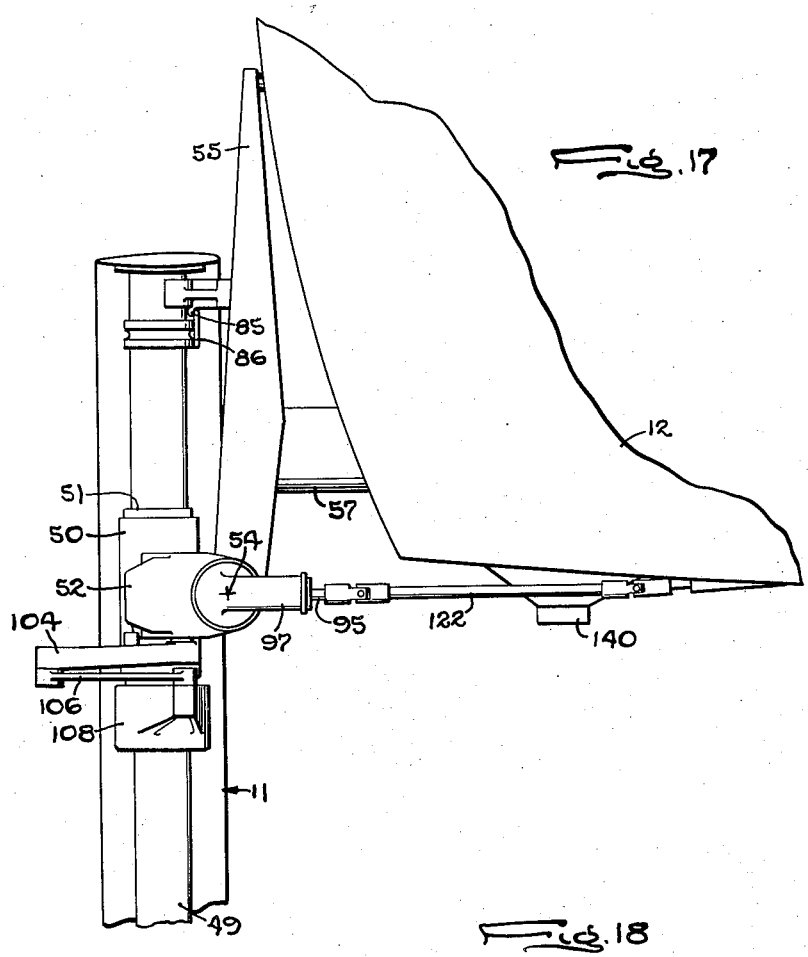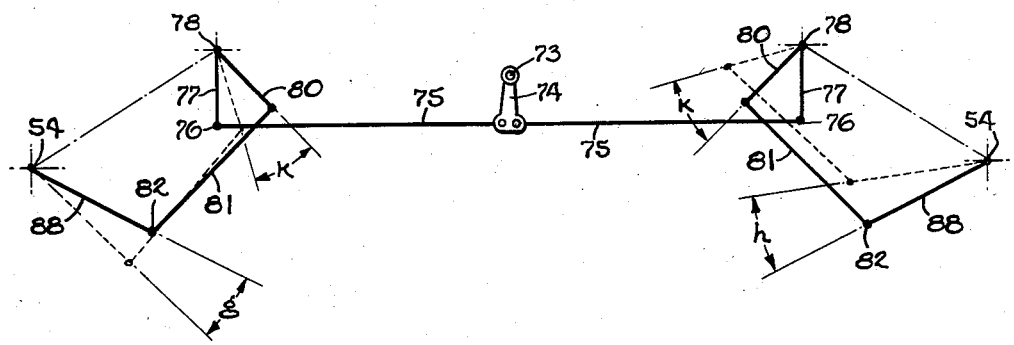

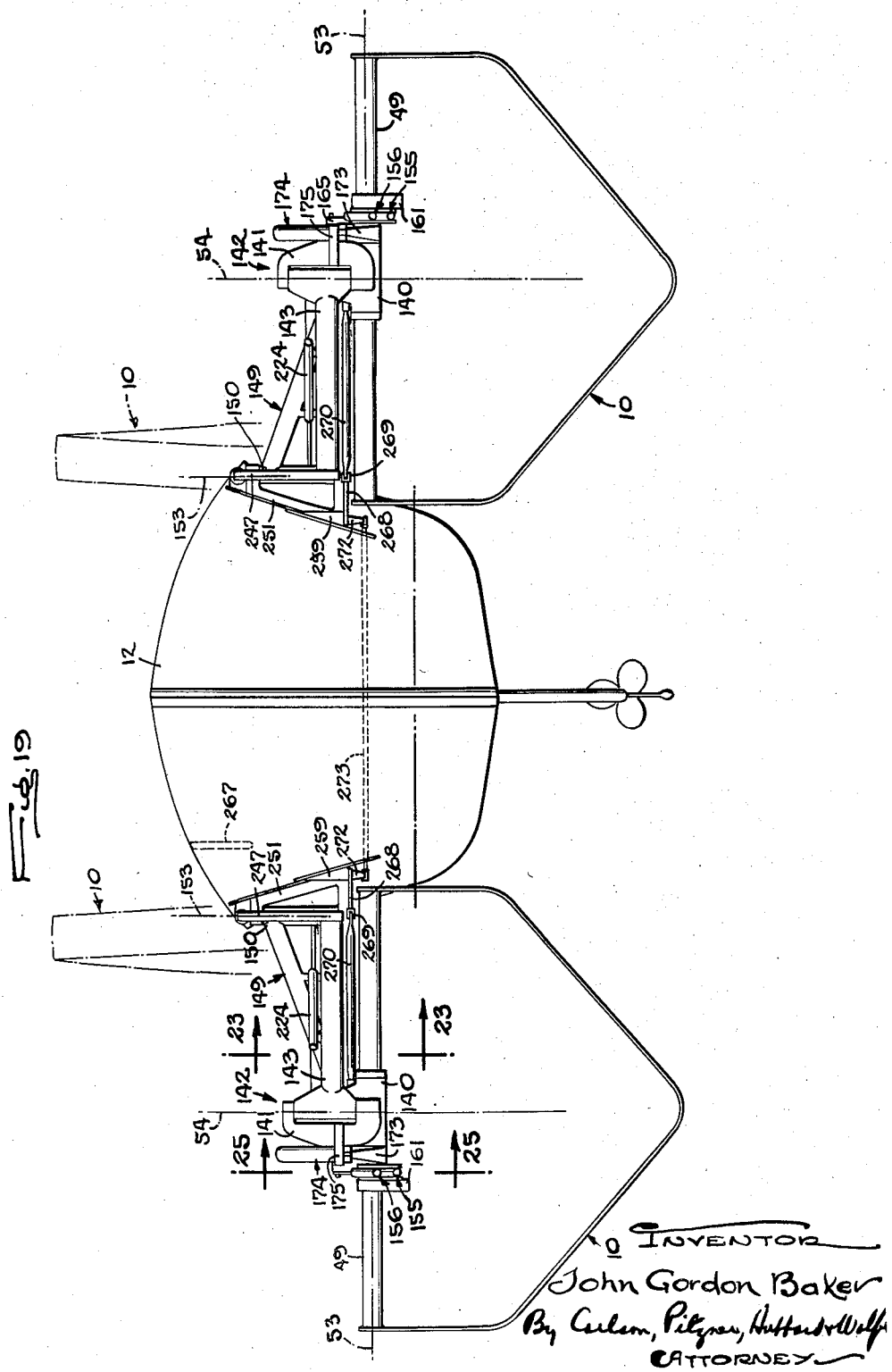

Oct. 21, 1958 J. G. BAKER 2,856,878
HYDROFOIL SYSTEM FOR BOATS
Filed Feb. 23, 1956 19 Sheets-Sheet 11
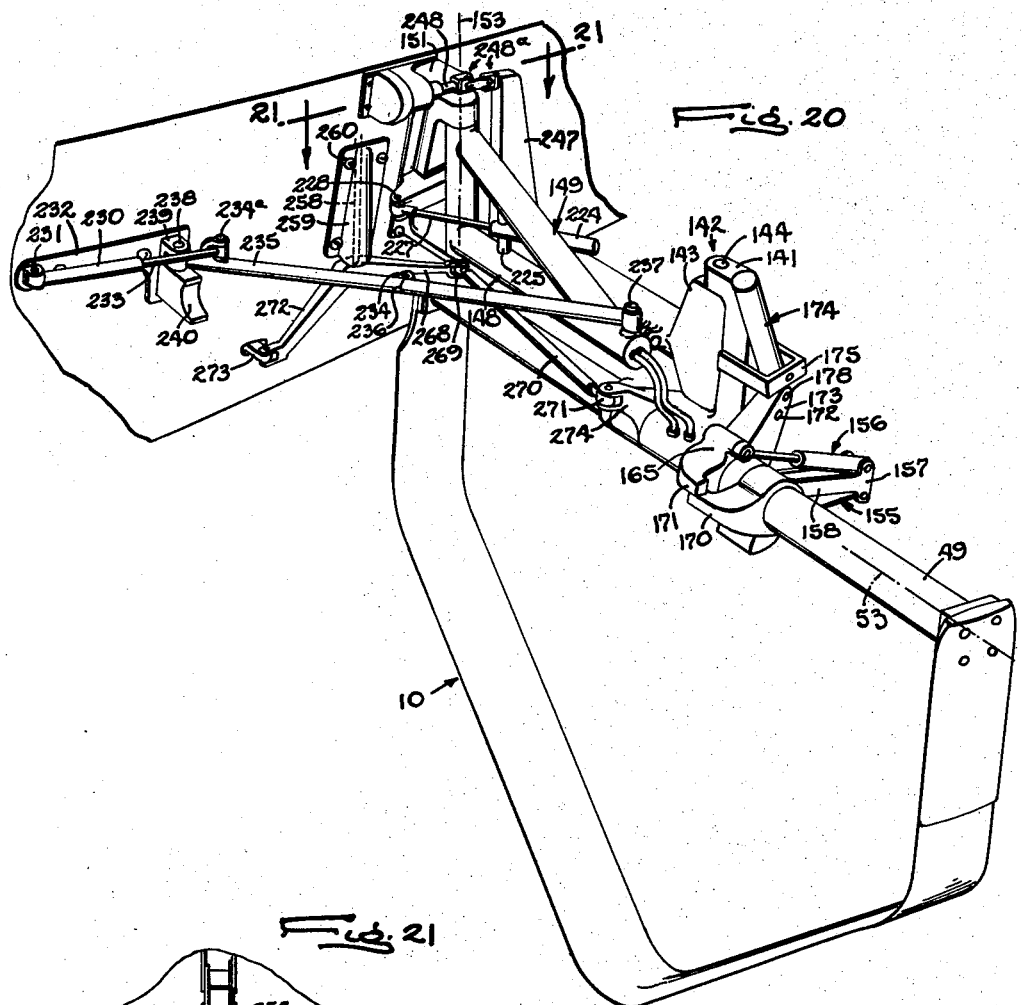
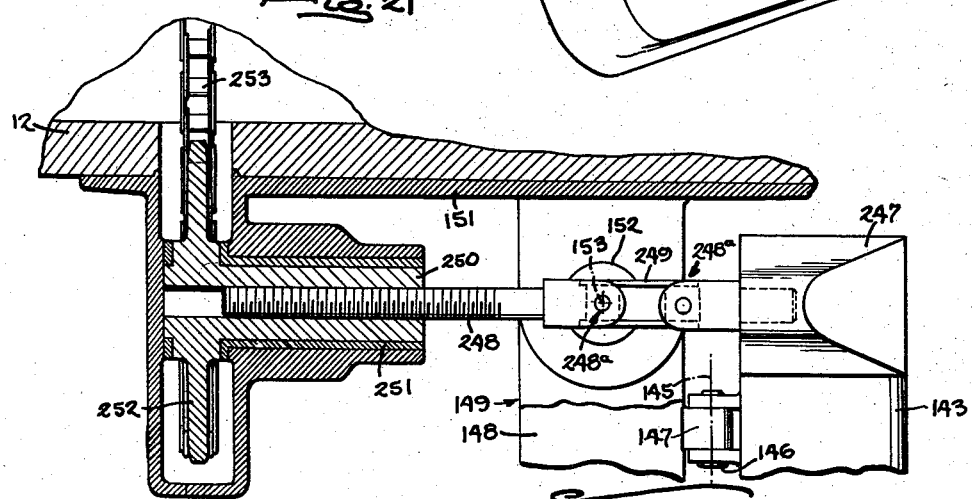
INVENTOR
John Gordon Baker
By Carlson, Pitzner, Hubbard & Wolfe
ATTORNEYS

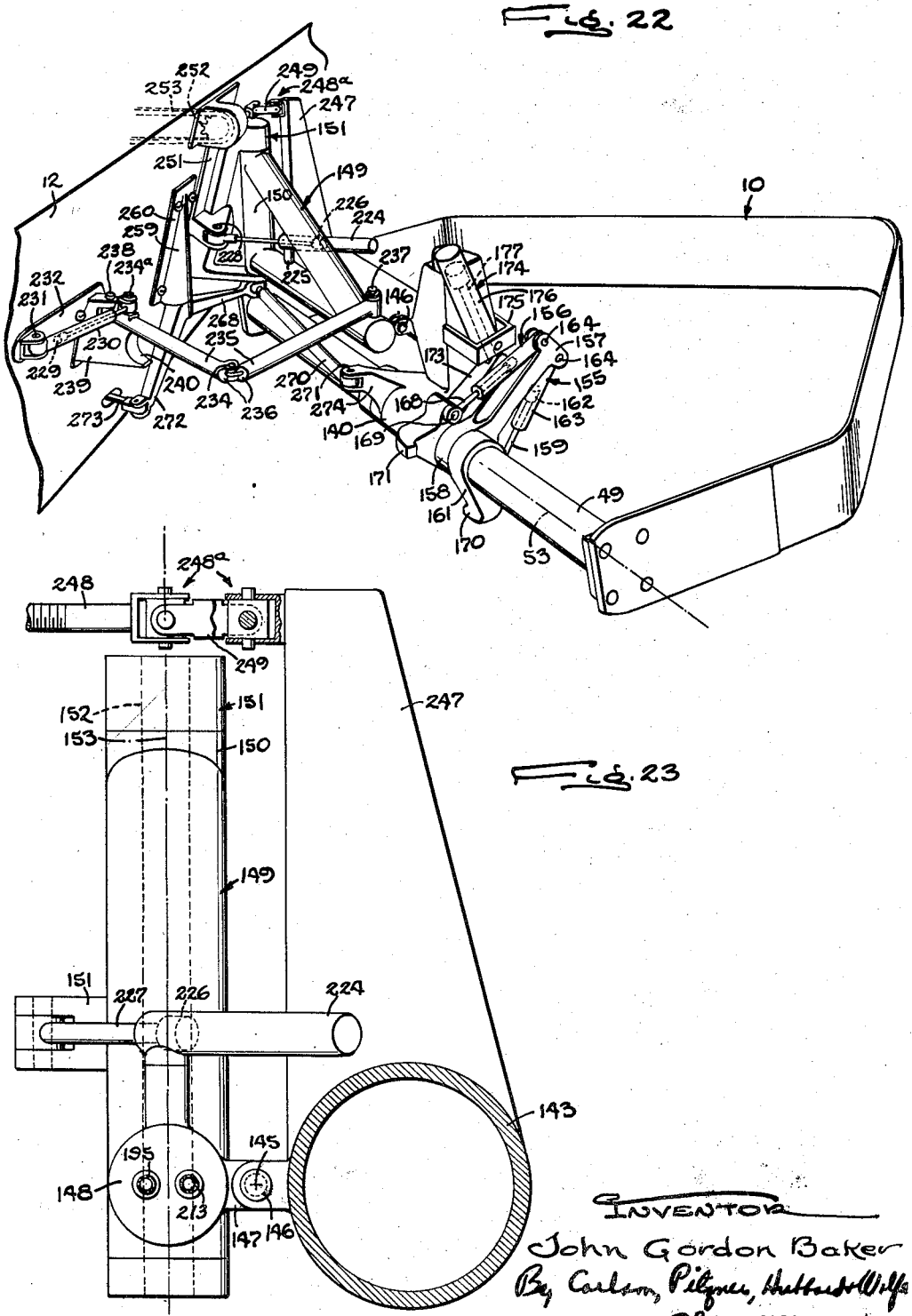

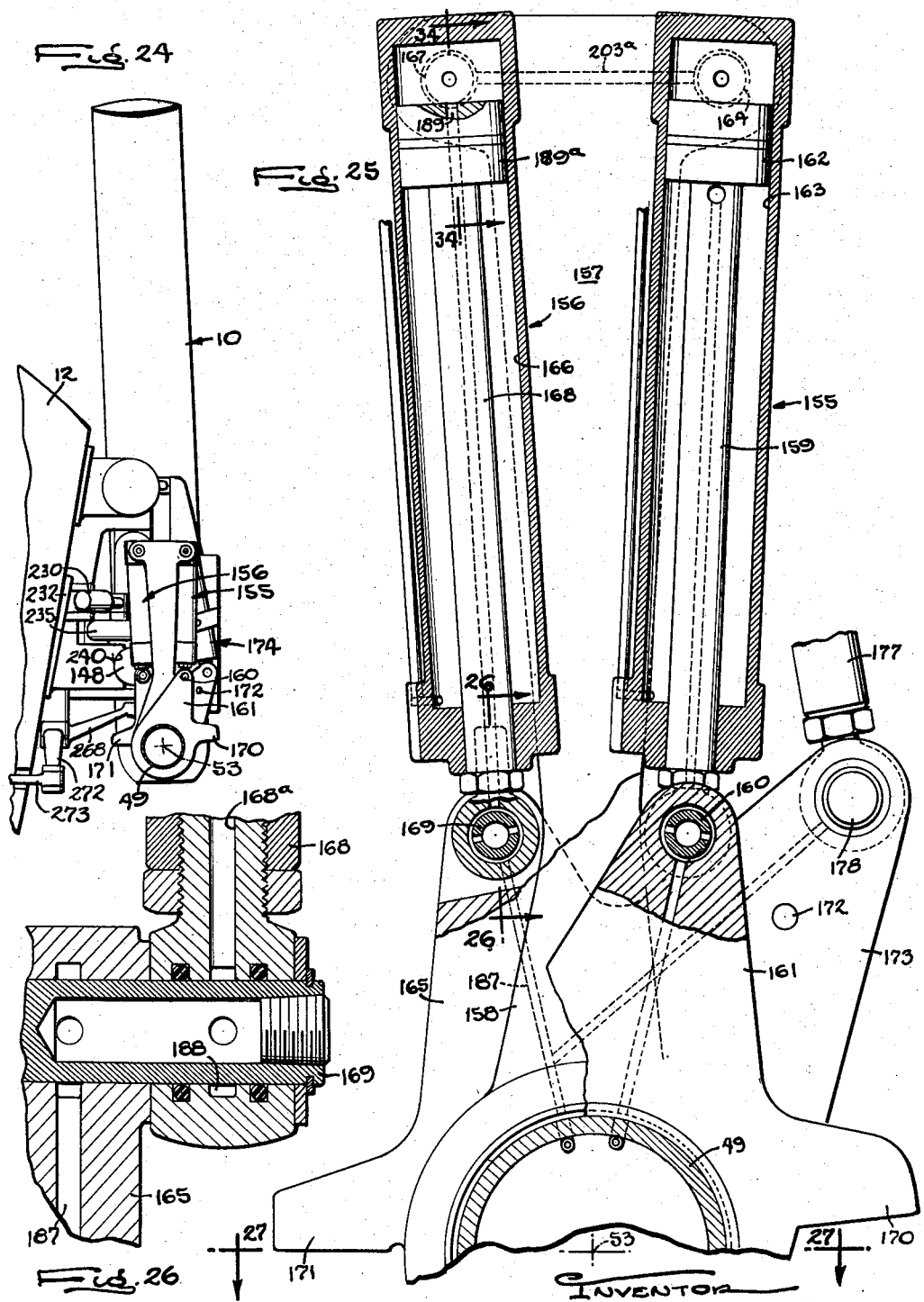

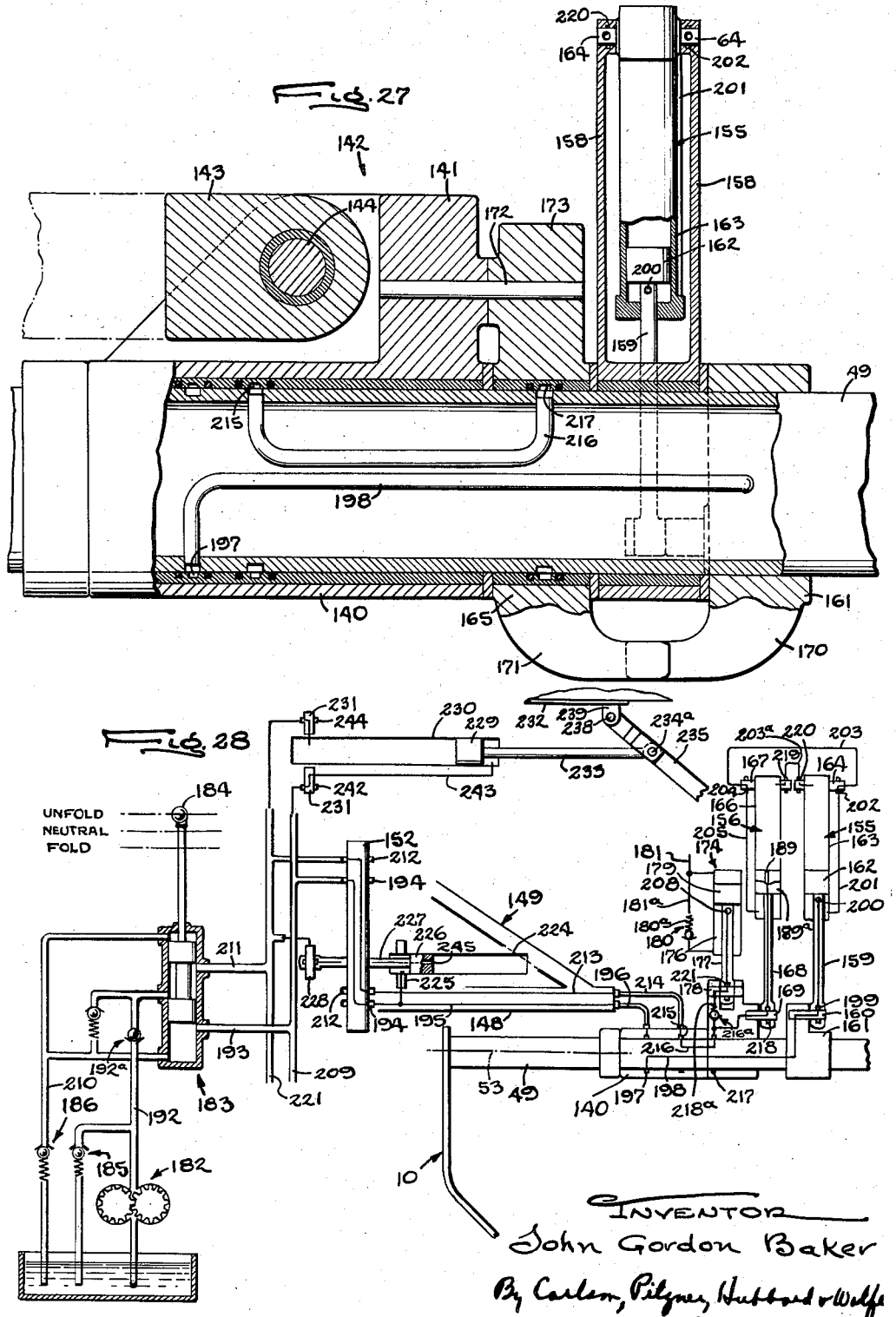

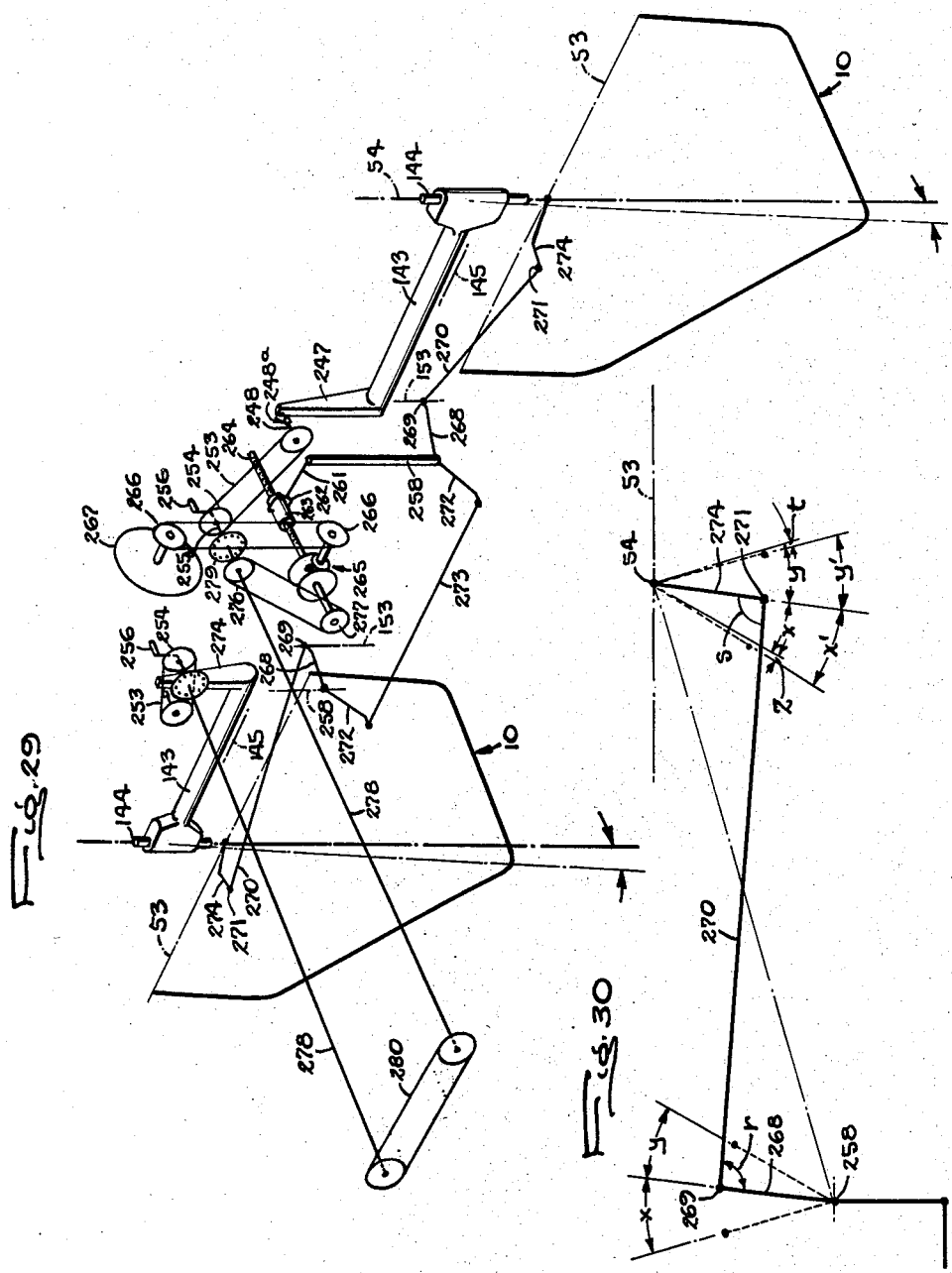

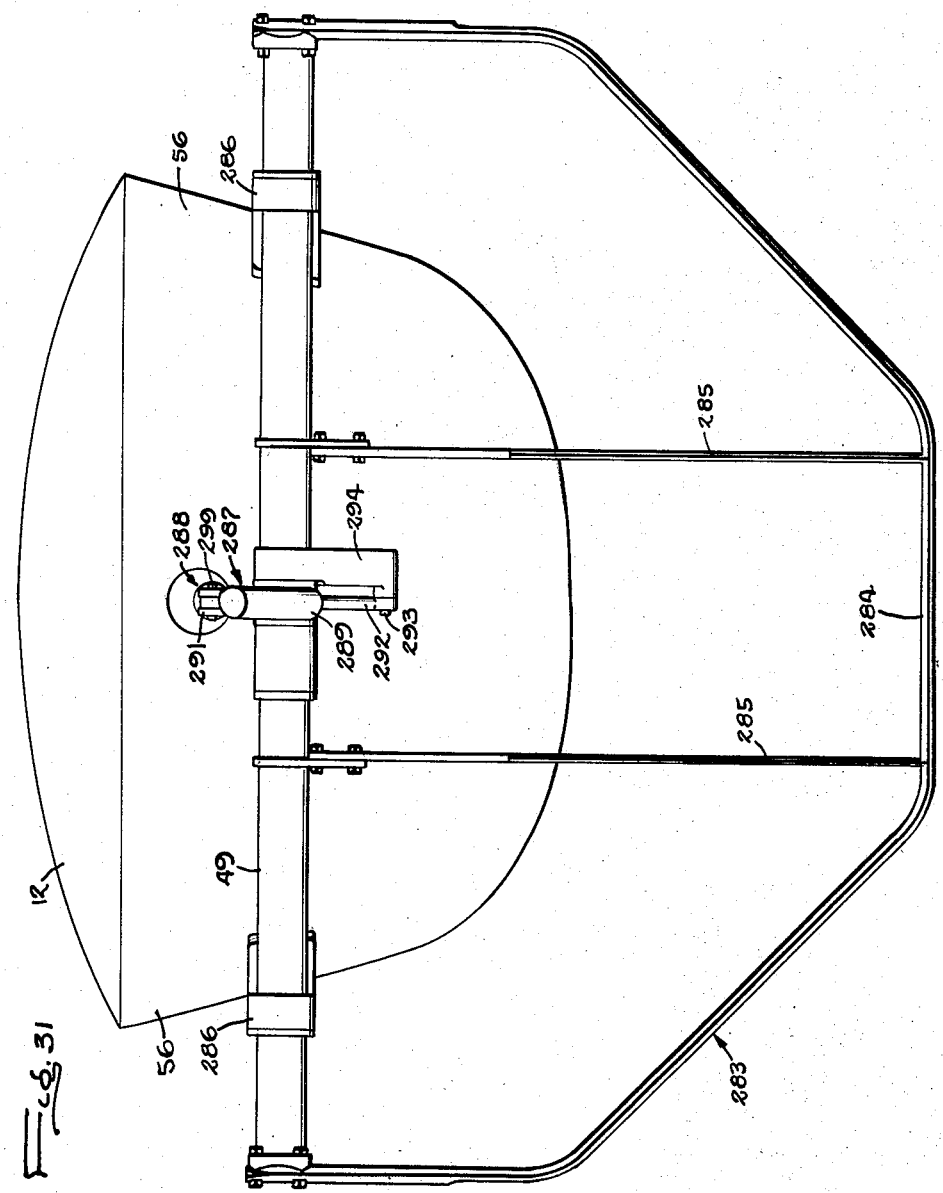

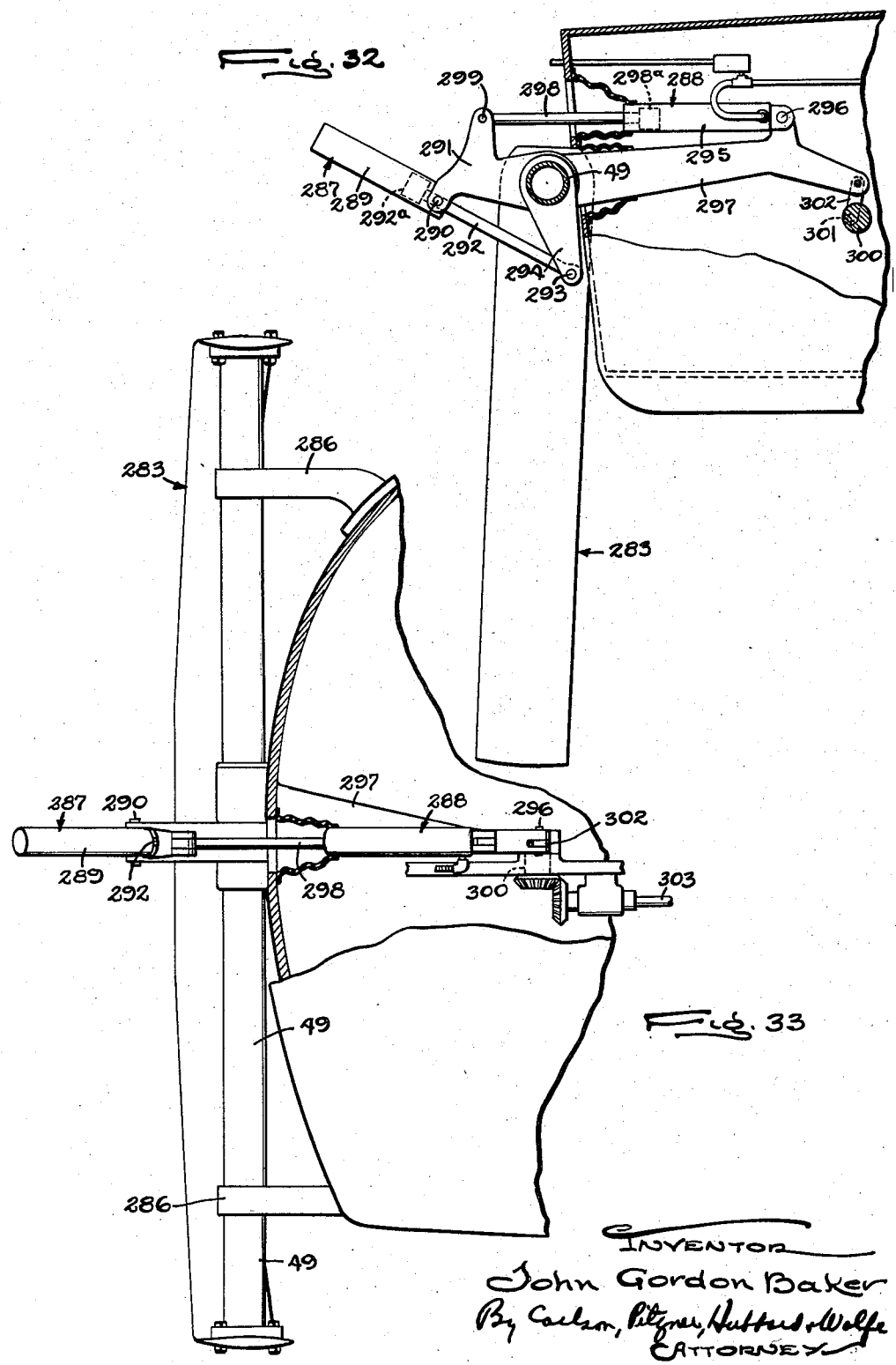

Oct. 21, 1958 J. G. BAKER 2,856,878
HYDROFOIL SYSTEM FOR BOATS
Filed Feb. 23, 1956 19 Sheets-Sheet 18
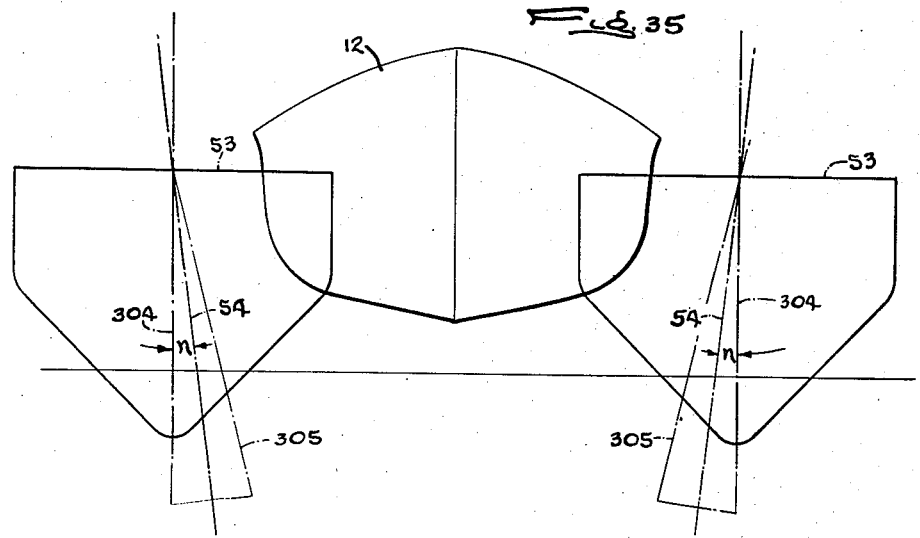
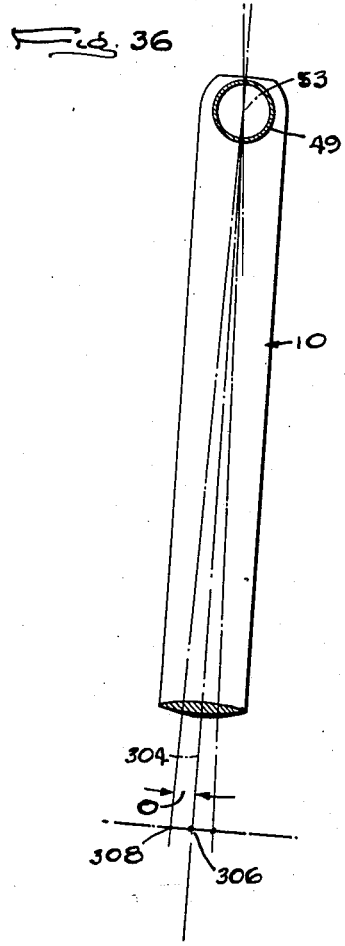
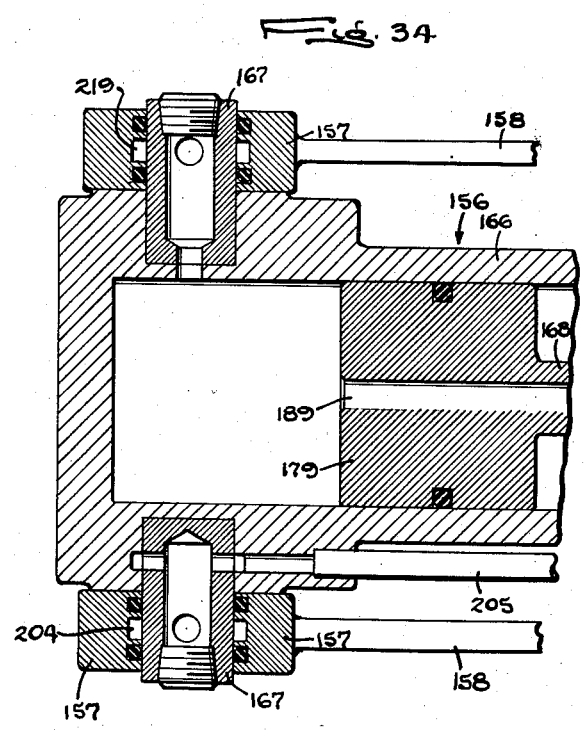
INVENTOR
John Gordon Baker
By Carlson, Pitney, Hubbard & Wolfe
ATTORNEYS

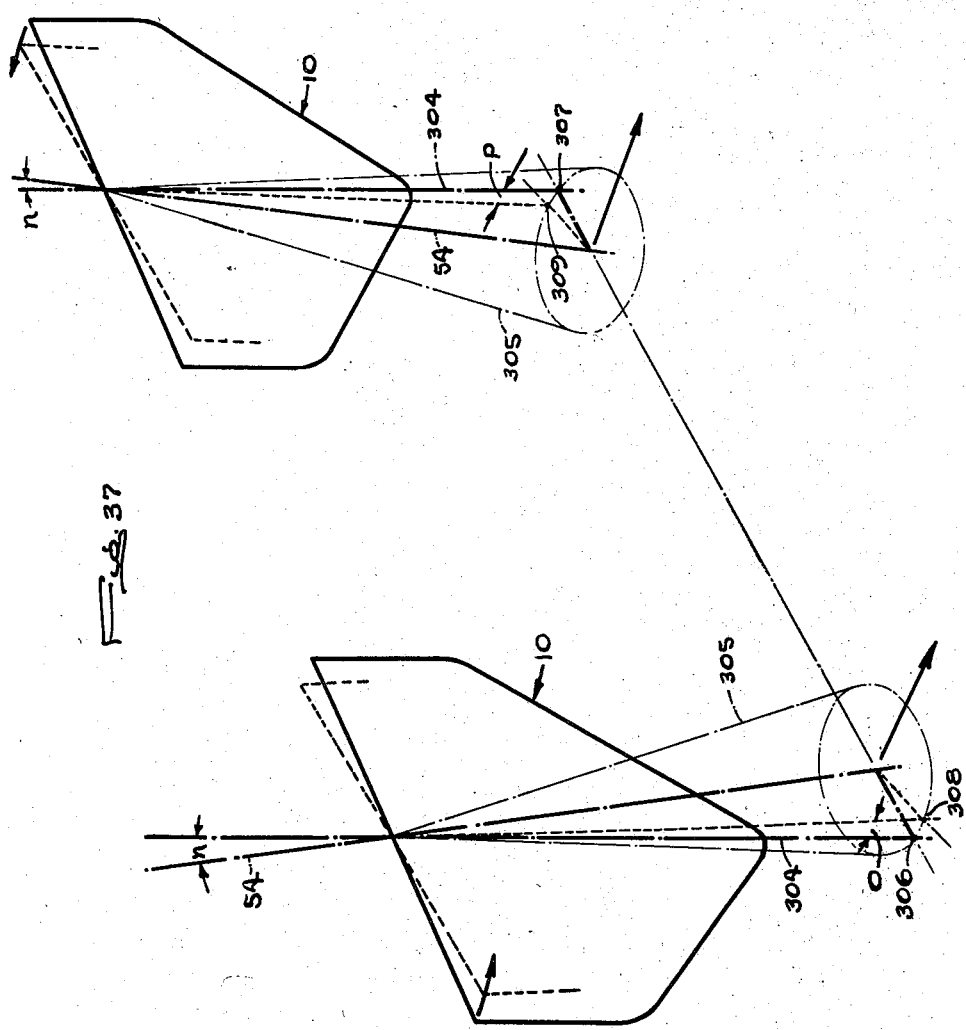

United States Patent Office 2,856,878
Patented Oct. 21, 1958

2,856,878

HYDROFOIL SYSTEM FOR BOATS

John Gordon Baker, Evansville, Wis.

Application February 23, 1956, Serial No. 567,303

38 Claims. (Cl. 114—66.5)

This invention relates to a system of so-called hydrofoils which are mounted on the hull of a boat and function by forward motion of the boat to raise and support the latter above the water.

One object is to provide a novel arrangement of hydrofoils which is much less susceptible than prior systems to dropping of the boat under extraordinary conditions that may be encountered in service use.

A second object is to provide a hydrofoil system for boats arranged to be adjusted automatically to suit operating conditions when negotiating a turn.

A third and more detailed object is to provide for automatic and differential variation in the effective angle of incidence of the different hydrofoils and to correlate such angle adjustments with the boat steering mechanism.

A fourth object is to mount the hydrofoils in a novel manner which not only permits of adjustment of their effective angles but also enables the foils to be lowered into the water or raised into an out of the way position by control from a remote point within the boat.

A fifth object is to provide a novel power actuated mechanism for folding and unfolding the several hydrofoils.

A sixth object is to incorporate in the foil folding mechanism a novel means for permitting yielding of the foil upon encountering an obstruction.

The invention also resides in the novel manner of mounting and actuating the hydrofoils to achieve the foregoing objects.

Other objects and advantages of the invention will become apparent from the following detailed description taken in connection with the accompanying drawings, in which:

Figure 1 is a front elevational view of a motor boat equipped with a hydrofoil system embodying the novel features of the present invention.

Fig. 2 is a fragmentary sectional view taken substantially along the line 2—2 of Fig. 1.

Fig. 3 is a fragmentary perspective view of the steering connection to one of the front hydrofoils.

Figs. 4 and 5 are fragmentary sectional views taken respectively along the lines 4—4 and 5—5 of Fig. 2.

Fig. 6 is a view similar to Fig. 5 but showing different positions of the parts.

Fig. 7 is a fragmentary view taken substantially along the line 7—7 of Fig. 1.

Fig. 8 is a fragmentary cross section taken along the line 8—8 of Fig. 7.

Fig. 9 is a schematic view of the mechanism for adjusting the positions of the hydrofoils.

Fig. 10 is a fragmentary sectional view taken along the line 10—10 of Fig. 8.

Figs. 11, 12, 13, and 14 are schematic views illustrating the different positions of a hydrofoil.

Fig. 15 is a fragmentary view similar to Fig. 2 but showing a different position of a hydrofoil and its mounting.

Fig. 16 is a fragmentary side elevational view of a boat equipped with the improved hydrofoil system, certain parts being broken away and shown in section.

Fig. 17 is a plan view of one of the rear hydrofoils and its mounting on the stern of the boat.

Fig. 18 is a diagrammatic view of the linkages for effecting differential steering automatically in negotiating a turn.

Fig. 19 is a view similar to Fig. 1 showing a modified arrangement for mounting the front hydrofoils.

Fig. 20 is a fragmentary perspective view of one of the front hydrofoils in normal operating position.

Fig. 21 is a fragmentary section taken along the line 21—21 of Fig. 20.

Fig. 22 is a view similar to Fig. 20 showing a front hydrofoil partially retracted and folded.

Fig. 23 is a fragmentary sectional view taken along the line 23—23 of Fig. 19.

Fig. 24 is a rear elevational view of the hydrofoil unit when folded against the side of the boat.

Fig. 25 is a fragmentary sectional view taken along the line 25—25 of Fig. 19 with the parts in the folded position of the hydrofoil.

Figs. 26 and 27 are fragmentary sectional views taken respectively along the lines 26—26 and 27—27 of Fig. 25.

Fig. 28 is a schematic view of the hydraulic circuit diagram.

Fig. 29 is a schematic view of the steering and incidence adjusting mechanism for the front hydrofoils.

Fig. 30 is a schematic view of the steering linkage.

Fig. 31 is a rear elevational view of a hydrofoil for supporting the stern of the boat.

Figs. 32 and 33 are side elevational and plan views partially broken away of the rear hydrofoil shown in Fig. 31.

Fig. 34 is a fragmentary sectional view taken along the line 34—34 of Fig. 25.

Fig. 35 is a schematic view of a modified arrangement of the steering axes for the front hydrofoils.

Fig. 36 is a vertical cross section of the hydrofoils shown in Fig. 35.

Fig. 37 is a schematic perspective view showing different positions of the hydrofoils shown in Fig. 36.

*Four foil system—Figs. 1 to 18*

*In general.*—In the form shown in Figs. 1 to 17, the improved hydrofoil system comprises two pairs of hydrofoils 10 and 11 mounted at the front and rear ends of a boat 12 adapted to be propelled by a screw 13 (Fig. 16) driven by an inboard motor 14 through a shaft 15 within a downwardly inclined tubular housing 18. Through a universal coupling 16 and a flexible collar 22, the propeller may be moved between the positions shown in full and phantom in Fig. 16 to permit the boat to be propelled while resting on the water surface or when supported above the latter by the hydrofoils. Such raising and lowering of the propeller may be effected by suitable mechanism disposed within the boat and connected to the tube 18 by a strut 28.

The hydrofoils 10 and 11 are of the construction disclosed in my copending application Serial No. 544,865, filed November 4, 1955 and each comprises generally a bar 48 of foil cross section shown in Fig. 2 with its intermediate portion or loop bent into a V (see Fig. 1) and its ends disposed parallel to each other and secured rigidly to opposite ends of a tube 49. Midway between its ends, the tube is journaled in a split bearing 50 (Figs. 1, 2 and 4) held between axially spaced shoulders 51 on the tube and formed on a housing 52 which is supported outwardly from the boat and above the water for adjustment about the axis 53 of the tube which, when the foils are disposed substantially in a vertical plane with the V's submerged in the water, is disposed horizontally and extends transversely of and normal to the center plane of the boat. By turning the supporting tube in the bearing 50, the angle of incidence of the foil and therefore the lifting effect on the lower or active part of the V may be varied or, the foil may be swung through a greater angle and withdrawn from the water. The angle of incidence of any one foil may be defined as the angle included between a vertical plane $a$ including the axis 53 (Fig. 11) and the plane of the leading edge of the foil. This angle is of positive value as indicated at $b$ when the foil is swung forwardly about the axis 53 to dispose the V of the foil ahead of the plane $a$. As this angle is increased in magnitude, the loading or the lifting force exerted on the active V-shaped lower end of the foil is increased. Conversely, the loading is decreased as the angle $b$ is reduced and such reduction may be continued by swinging the foil backwardly past the plane $a$ so that the angle of incidence becomes negative as indicated at $c$ in Fig. 11.

The housing 52 supporting each front foil 10 is also adapted to swing about an upright axis 54 to permit the use of these foils in steering the boat while supported by the hydrofoils. For this purpose, the housing, in the form shown in Figs. 1 to 6, is mounted on the outer end of a rigid projection 55 anchored securely on the boat frame and extending outwardly and laterally from the bow in the case of the front foils 10 or from the transom 56 in the case of the rear foils 11. The supports 55 for the front foils 10 are the opposite end extensions of a straight tube extending transversely through the bow of the boat well above the water surface. In the case of each rear foil, the support 55 is a bracket (Fig. 22) bolted at one end to the transom and welded near the other end to a tube 57 projecting rearwardly from the transom.

*Mounting of front hydrofoils.*—Referring to Figs. 2, 3, and 4, the housing 52 for each front foil is an upright hollow casting with the tube bearing 50 formed on the rear side and at the bottom thereof. The other side of the housing is disposed between parallel horizontal arms 58 and 59 of a bracket 60 fabricated of sheet metal and welded onto the outer end of the supporting tube 55. The arm 58 projects rearwardly near the level of the tube and supports an antifriction bearing 61 in which a tubular projection 62 on the top of the housing is journaled. The bracket arm 59 which is disposed well below the tube 55 supports an upstanding pin 63 which is alined with the upper bearing 61 and supports the lower end of the housing through the intermediary of an antifriction thrust bearing 64.

The hydrofoils 10 are thus supported from the ends of the tubes 55 to swing about the vertical axes 54 on opposite sides of the bow, these axes being defined by the bearings 61 and 64 and offset a short distance forwardly from the tilting axis 53 of the hydrofoils. Such swinging of the housings in corresponding directions to steer the boat to the right or left and at the desired angle results from turning a hand wheel 65 (Figs. 7 and 8) on a tubular shaft 66 which projects through and is journaled in the instrument panel 117 and the bulkhead 118 of the boat. At its inner end, the shaft 66 carries a sprocket connected through an endless chain 67 and sprocket to a shaft 68 suitably journaled on the bulkhead and boat frame and extending forwardly through universal couplings 69 to a point above the supporting tube 55 and within the bow of the boat.

Within a gear casing 70 (Fig. 2) rigid with the tube 55, the forward end of the shaft 68 is keyed to a worm 71 meshing with a worm wheel 72 on a shaft 73 which, below the gear casing, carries an arm 74 projecting rearwardly and into the tube 55 through a slot therein. The free end of the arm is pivotally joined to one end of a rod 75 which extends along the tube within the latter to a point 76, near the right front hydrofoil, of connection with an arm 77 fast on an upright shaft 78 journaled in a hollow support 79 on the front of the tube 55. Below this bearing support, the shaft 78 is keyed to an arm 80 pivotally connected through a link 81 and a ball and socket joint 82 to the cross bar 49 of the hydrofoil. To permit the latter to be folded out of the way independently of the steering mechanism, the latter connection (see Fig. 3) includes a block 83 rigid with two flanges 84$^a$ spanned by a plate 84 which curves downwardly and fits closely around one-half of the tube 49 at a point axially spaced a short distance inwardly from the housing 52 and between the latter and the boat when the hydrofoil is in active vertical position.

In this position, an arcuate lug 85 on one of the plates 84 underlies a lug 86 on a collar 87 rigid with the tube 49 adjacent the joint 82. With the lugs 85 and 86 thus engaged as shown in Fig. 3, the curved plate 84 is held tightly against the tube 49, and the hydrofoil and its housing 52 will be coupled to the link 81 so as to be turned back and forth as illustrated in Fig. 11 about the steering axis 54 in response to turning of the steering wheel 65 in opposite directions. On the other hand, if the hydrofoil is swung forwardly and upwardly in the bearing 50 to the horizontal position shown in Fig. 12, the lug 86 will be turned downwardly and clockwise as viewed in Fig. 3 and will pass out of engagement with the lug 85. This disconnects the foil from the steering mechanism and permits independent movement of the foil to the inactive or carrying position to be described later. While the foil is thus freed, the position of the joint 82 for proper reengagement of the curved plate 84 and the foil tube 49 is maintained by virtue of a curved link 88 rigid at one end with the joint supporting block 83 and joined at the other end to the housing 52 through a pivot 89 (Fig. 2).

A second link 75 extends from the arm 74 outwardly to the steering mechanism for the left front hydrofoil which is of the same construction as indicated by corresponding reference characters. The two hydrofoils 10 are thus arranged to be swung in the same direction in response to turning of the steering wheel.

*Oversteering.*—It will be observed from Fig. 2 that the housing 52 between the joint 82 and the steering axis 54 forms one end of a quadrilateral polygon of generally trapezoidal shape, which is longer than the other end formed by the arm 80. The side of the trapezoid formed by the arm 80 is made considerably shorter than the stationary side defined by the support 55 between the axis 54 and the shaft 78. Due to the geometric shape of this polygon formed by the arm 80, the link 81, the distance from the pivot 82 to the axis 54, and the distance of this axis from the shaft 78, the right front hydrofoil 10 will, when the arm 80 is swung through a given arc to turn the boat to the left, be swung through a lesser angle than when the arm 80 is swung through an equal angle in the opposite direction to turn the boat to the right. For the same reason, a similar but reverse difference in the amount of turning occurs at the left front hydrofoil.

The differential or oversteering action above described is illustrated in Fig. 18. From this it will be seen that the actuating linkages for the hydrofoils on opposite sides of the boat each comprises the arm 80 which swings about the fixed axis 78, an arm formed by the housing 52 which swings about the parallel steering axis 54 and a link 81 connecting the free ends of the two arms. In this linkage, the two arms 52 and 80 are of different lengths and the axes 54 and 78 are spaced apart a distance greater than the length of the link 81. As a result of this arrangement, if in making a right turn, the interconnected arms 80 of the two hydrofoils are swung through a given angle $k$ away from the straight ahead positions shown in full and to the positions shown in phantom, the arm 52 and the right hydrofoil will swing through an angle $h$ while the left hydrofoil and its arm 52 will be swung through a lesser angle $g$.

Conversely, if the arms 78 are swung in the opposite direction away from the straight ahead position to make a left turn, the left foil will be turned through an angle greater than that of the right foil.

The result is that during steering of the boat in either direction, the inside front hydrofoil will be swung about its axis 54 through a greater angle than the outside foil. A greater part of the steering load is thus transferred to the inner foil. The amount of such oversteering of the inner foil is, by proportioning the trapezoidal linkage, made of sufficient magnitude to substantially equalize the loading of the two foils during the making of a turn.

If desired, the hand wheel 90 (Figs. 7 and 9) for turning the rudder 27 may be arranged on the same axis as the foil steering wheel 65. To this end, the wheel 90 is keyed to a shaft 91 projecting through the shaft 66 and at its other end carries a sprocket for a chain 92 extending to a speed reducing mechanism for rocking an arm 93 leading to the rudder through a connection including a rod 94.

*Incidence angle adjustment.*—Swinging of each hydrofoil about its axis 53 of its supporting tube 49 to vary the angle of incidence of the active part of the foil is effected from the remote point of control within the boat through a rotary drive connection which extends outwardly through the boat hull into the housing 52 along the steering axis of the latter and finally outwardly from the housing to a point on the hydrofoil offset from the axis 53 thereof. The outboard portions of these connections for tilting the front foils 10 include shafts 95 (Figs. 2, 4 and 9) which extend outwardly through the bow of the boat on opposite sides of the latter and above but adjacent the supporting tubes 55. The outer end of each shaft is journaled in bearings 96 in one end of angular casing 97 which at its other end fits over the top projection 62 on the foil supporting housing 52 and is made rigid with the stationary support for the bearing 61. Through bevel gears 98, each shaft 95 is coupled to the upper end of a vertical shaft 99 journaled in spaced bearings 100 in the housing 52 and carrying intermediate its ends a worm 101. The latter meshes with a worm wheel 102 keyed to a shaft 103 journaled in opposite vertical walls of the housing 52 above the foil bearing 50 with one end projecting outwardly therefrom.

Clamped on the outer end of the shaft 103 is a crank arm 104 which, when the foil is in active submerged position, projects forwardly and substantially horizontally as shown in Fig. 5. The free end of this arm is pivoted at 105 to one end of a straight connecting rod 106 which extends rearwardly along the crank and at its opposite end is pivotally joined at 107 to the free end of an arm 108 upstanding from and clamped securely around the supporting tube 49 of the hydrofoil at a point adjacent the housing 52.

It will be apparent from Fig. 5 that rocking of the crank 104 along an arc 110 will shift the pivot 107 and thus swing the hydrofoil through a small angle corresponding to the foreshortening of the arc through which the crank 108 and therefore the tube 49 is turned. Clockwise turning of the crank 108 as viewed in Fig. 5 to swing the hydrofoil and decrease the angle of incidence of its active V-shaped portion is limited in the present instance when a pin 111 on the crank encounters a stop 112 on the side of the housing 52. The incidence angle is then of negative value as indicated at *c* in Fig. 11.

When the crank 104 and the link 106 are disposed close together and alongside each other as shown in Fig. 5, it will be apparent that the motion of the adjusting shaft 95 will be transmitted to the hydrofoil at an extremely low ratio and therefore at high mechanical advantage. Very accurate adjustment of the angle of the foil is achieved and each setting is maintained securely by virtue of the worm connection 101, 102.

*Folding front hydrofoils.*—The crank 104 is free to turn in the counterclockwise direction through nearly a half revolution to permit the hydrofoil to be swung upwardly to a horizontal position (Fig. 12) and then, after it has been swung manually about the vertical or steering axis 54 to the position shown in Fig. 13 and in phantom in Fig. 2, swinging of the crank may be continued on through the position shown in phantom in Fig. 6, to bring the foil into the upright position alongside the boat as shown in Fig. 14. In this movement, the angle between the crank 104 and the link is increased substantially so that the adjusting motion is transmitted to the hydrofoil more directly as is permissible because of the comparable small torque required for swinging the unloaded foil.

After the initial upward swinging of the hydrofoil far enough, about ninety degrees, to move the lug 86 (Fig. 3) past the lug 85 and thereby disconnect the foil from the steering mechanism, the foil and its housing must be swung manually about the steering axis 54 and clockwise as viewed in Fig. 2 to the position alongside the boat as shown in Fig. 13. This position is determined by engagement of the housing 52 with a yieldable bumper 113 (Figs. 4 and 15) on the side of the bracket 60.

As the counterclockwise turning of the crank 104 is continued on through the position shown in full in Fig. 6, the hydrofoil is swung upwardly above the horizontal and finally reaches the upright or inverted position shown in Figs. 14 and 15. This position is determined by wedging engagement of a lug 114 on the arm 108 with the side of an extension 115 on the bracket 60 as shown in phantom in Fig. 6. As an incident to such engagement, the housing 52 is urged more tightly against the bumper 113, the hydrofoil thus being held firmly in its out of the way position alongside the bow of the boat.

The inboard part of the angle adjusting connection for the right front hydrofoil 10 includes within the bow of the boat a casing 120 (Fig. 2) supported by a bracket on the pipe 55 and housing bevel gears 121 (Figs. 2 and 9) are fast on the shaft 95, the other being on a shaft 122 which includes the necessary universal couplings. This shaft extends rearwardly through the bulkhead 118 and carries a hand crank 123 with a spring detent 124 thereon which may be entered in different holes around a disk 125. The latter is fast on a tubular shaft 126 journaled in bearings 127 in the bulkhead and itself supporting bearings for the shaft 122 extending therethrough. When the detent is entered in one of the holes, the disk and crank 123 turn together but when the detent is retracted, the crank and the shaft 122 may be turned independently.

*Rear hydrofoils—mounting and actuation.*—Similar motion transmitting connections including shafts 122 and 126, and cranks 123 are extended to the angle adjusting shafts 95 of the left front foil 10 and the two rear hydrofoils 11 to enable the incidence angles thereof to be adjusted individually and independently of each other. For the latter foils, the shafts 122 are extended rearwardly along but beneath the side rails of the boat and finally out through the side of the boat as shown in Fig. 22, the gear casing 97 projecting forwardly and longitudinally of the boat instead of transversely of the latter as in the case of the front hydrofoils. Also, in order to extend the shafts 122 for the foils 11 rearwardly, these shafts are divided into laterally spaced parts joined by endless chains 128 (Figs. 7 and 9).

In the case of the rear foils 11, the arm 59 of the supporting bracket projects forwardly and the lug 85 is mounted on the support 55 for interengagement as described above with the lug 86 which is disposed near the inner end of the tube 49. Thus, as the rear foils are swung rearwardly and upwardly out of the water, they are disconnected from the lug 85 and thus freed to permit the hydrofoils to be swung about the axes 54 to positions alongside the boat.

*Automatic incidence control with steering.*—In accordance with another aspect of the invention provision is made for adjusting the incidence angles of the several hydrofoils automatically in the course of making a turn whereby to vary the lifting forces exerted thereon in a manner such as to compensate for and reduce the tendency of the boat to roll outwardly. This is accomplished by adjusting shafts 122 simultaneously with the turning of the steering wheel 65 so that during the making of a turn, the incidence angle, as defined above, of the inside foils 10 and 11 is decreased while the angle of the outside foils 10 and 11 is increased correspondingly. For this purpose, sprockets 130 are keyed to the four tubular shafts 126 and an endless chain 131 extends around these sprockets successively and, between the two lower sprockets, the chain extends upwardly and over a sprocket 132 fast on the steering shaft 68.

With this arrangement, turning of the steering wheel 65 moves the chain in a corresponding direction thereby turning the shafts 122 and 95, and the worms 101 of the four angle adjusting mechanisms. By reversing the angle of the worms 101 of the foils on opposite sides of the boat and correlating these angles relative to each other, the adjusting mechanisms are adapted to tip the respective foils about their axes 53 and to the proper degrees. For example, if the various foils are disposed in planes indicated at *d* (Fig. 9) when the steering wheel 65 is rotated to swing the foils 10 for a left turn as indicated by the arrows 134, the left or inside foils at the front and rear of the boat will be tipped as indicated by the arrows 135 to the positions *f*, the incidence angles and therefore the loading of these foils being thereby decreased. At the same time, the foils of the right side of the boat are tipped forwardly to positions *g* as indicated by the arrows 136 thus increasing the incidence angle and the loading of these foils. In a similar way, the direction of tilting of the different foils is reversed during the turning of the steering wheel in a direction to steer the boat to the right. By varying the sizes of the sprockets or other parts of the angle adjusting mechanisms, the amount of the automatic tilting of the foils may be proportioned properly to produce the desired compensating action during either a right or a left turn. At the same time, the incidence angle of any selected hydrofoil may be adjusted individually by retracting the corresponding detent 124 and turning the crank 123. The new position is retained by allowing the detent to enter a new hole in the disk 125.

Except for the construction of its support 35 and the position of the gear casing 97, construction mounting and operation of each rear foil is the same as the front foils. Because of these differences, a stop 140 is mounted on the side of the boat and the tube 49 is held against the stop in the folded position.

*Operation and advantages.*—To condition the boat above described for hydrofoil operation, the strut 28 is adjusted to lower the propeller 13 to the position shown in full in Fig. 16 and the four hydrofoils 10 and 11 are lowered into the water as shown in Fig. 9, the cranks 123 having been adjusted to provide the desired angles of incidence for lifting the boat out of the water. As the boat accelerates, the foils become effective to raise the boat gradually out of the water and to the position shown in Fig. 1. The weight of the boat is thus distributed to the four widely spaced hydrofoils so that the boat travels forwardly when the front foils 10 are disposed in a common plane perpendicular to the center line of the boat. When the wheel 65 is turned, both front foils are swung about the axes 54 in the same direction but through slightly different angles as described above thus initiating turning of the boat. Simultaneously and by the motion of the steering wheel, the angles of incidence of all four foils are changed for the purpose above described. By virtue of these automatic adjustments and the wide spacing of the four foils 10 and 11, marked stability of operation is achieved even in rough water.

Lowering of the boat onto the water surface results from slowing down of the engine. After this, the four foils may be swung forwardly and upwardly to a horizontal position out of the water. This is accomplished after disengaging the separate detents 124, by turning the individual cranks 123 until the respective foils have been swung upwardly out of the water (Fig. 12). Then, after turning the crank 47 to raise the propeller, the operation of the boat on the water surface may be continued.

When the hydrofoils are out of the water, they are disconnected from the steering mechanism and from the rear brackets 55. To bring them to the folded position, the front foils are swung about the axes 54 rearwardly to positions alongside the bow (Figs. 13 and 15) and the rear foils are swung forwardly alongside the boat stern. Then, after turning the steering wheel 65 to the straight ahead position, the detents 124 are released, and the individual cranks 123 are turned to continue the swing of the foils thus moving the latter from the horizontal position (Fig. 13) to the upright position (Fig. 14) where the foils are securely held in the manner previously described.

The employment of four hydrofoils and their arrangement at four widely spaced points at the bow and stern of the boat is highly advantageous particularly because it minimizes the danger of dropping of the boat in the water due to unusual conditions that may cause a sudden loss of lift of at least one hydrofoil resulting from the breaking away of the water flow from the top of such hydrofoil. Such loss of lift at one of the four foils will not under ordinary load conditions result in dropping of the boat. That is to say, the loss of lift at one foil will merely result in the transfer of the load to the other three foils whose wide spacing both laterally and longitudinally of the boat is such as to minimize momentary tipping of the boat and resultant dropping of the latter. The provision of two front hydrofoils and the disposal of the latter outwardly from the sides of the bow is advantageous with certain types of boats, the bow of which must not be obstructed at the front.

System shown in Figs. 19 to 34

In the operation of certain hydrofoil boats, it is desirable to provide for rapid folding and unfolding of the foils as for example in approaching shallow water. To accomplish this and at the same time minimize the overall size and weight of the operating parts, the present invention contemplates the provisions of a plurality of power actuators in each outboard hydrofoil unit and the transmission of power for energizing these actuators from a common source within the boat.

*Mounting of front hydrofoils.*—In the system shown in Figs. 19 to 34, two hydrofoils 10 are employed for supporting the front of the boat, each being of the same construction as those described above with the same reference numerals being applied to the corresponding parts. The cross tube 49 of each hydrofoil is journaled about midway between its ends in a bearing sleeve 140 (Figs. 19, 20, 22, and 27) offset laterally from the lower end of an upstanding block 141 which forms part of a steering knuckle 142. The block is bifurcated to receive the outer T-shaped end of a bar 143 which projects horizontally and outwardly from the side of the boat 12 near the bow thereof. The head and fork are joined together by an upright kingpin 144 which defines the upright axis 54 about which the block and the foil suspended therefrom may swing as a unit to steer the boat, while at the same time permitting the foil to turn in the bearing 140 to submerge and retract the foil.

In this instance, adjustment of the incidence angle of the foil is achieved by turning of the foil and its support bar 143 about a separate horizontal axis 145 (Figs. 21, 23 and 29). To this end and at spaced points along its length, the bar 143 is joined by alined pins 146 with ears 147 spaced along the base part 148 of a triangular frame 149 (Figs. 19 and 20) which thus supports the bar for swinging about the horizontal axis 145 defined by the pins 146 and disposed near, slightly above and parallel to the axis 53 of the hydrofoil cross-tube 49.

To permit the unit with the foil retracted out of the water to be swung horizontally and thus folded as before against the side of the boat, the inner upright end 150 of the frame 149 is received between vertically spaced arms on a bracket 151 and pivotally joined to the arms by an upright kingpin 152 (Figs. 21 and 23). The bracket is suitably fastened to the side of the boat above the static water level (Fig. 19). The frame and the other parts carried thereby are thus mounted to swing as a unit relative to the boat about an upright axis 153 which is disposed close to the side of the boat and parallels the upright steering axis 54. By turning the entire unit about the axis 153 and clockwise from the normal operating position shown in Fig. 20, the tube 49 of the hydrofoil may be folded to a position alongside the boat (Fig. 24). To complete the folding and unfolding of a hydrofoil, the tube 49 of the latter is rotated to swing the hydrofoil vertically through a half revolution to carry the foil proper first forwardly from the operating position shown in Fig. 20 and then upwardly to the folded position shown in Fig. 24.

*Front foil actuators.*—In this instance, such swinging is about the axis 53 of the hydrofoil cross-tube and is effected by the combined action of two power actuators 155 and 156 (Figs. 19, 20, 25, and 27) of the reciprocating piston type each capable of swinging the hydrofoil through a quarter revolution. Herein, the actuators are disposed on opposite sides of the cross-tube and are connected to the outer forked ends 157 of an arm 158 having a hub loose on and projecting forwardly from the cross-tube. The hollow piston rod 159 (Figs. 22, 25) of the actuator 155 is pivoted on a stud 160 projecting laterally from an arm 161 (Fig. 24) fast on the tube 49 thus connecting the actuator to the hydrofoil. A piston 162 on the rod slides in a cylinder 163 whose head end is fulcrumed on trunnions 164 carried by the ends of the arm 158 which is disposed between the hubs of the arm 161 and a bell crank 165 loose on the tube 49 adjacent the outer end of the bearing sleeve 140. The cylinder 166 of the other actuator 156 lies along the opposite side of the arm 158 and is fulcrumed on trunnions 167 between the free ends 157 of the latter arm. The piston rod 168 projecting from the other end of the cylinder is pivoted on a stud 169 on the hub of the bell crank 165 at a point above the cross-tube 49.

Behind the hydrofoil when in normal operating position (Fig. 20), the free ends of the arm 161 and the bell crank 165 are bent laterally to form lugs 170 and 171 which abut as shown in Fig. 20 when the foil is in operative position while leaving the foil free to swing forwardly and upwardly during folding by the actuators 155 and 156. When the lugs are in abutment, the arm 161 and the bell crank 165 provide a positive one-way connection between the cross-tube and the other end of the bell crank which is normally held against turning by means adapted to yield automatically upon a predetermined overloading of the hydrofoil as when an obstruction is encountered while the boat is moving forwardly.

*Load limiting means.*—This means applies a continuous force overcoming the normal water thrust exerted on the hydrofoil while at the same time permitting backward yielding and swinging of the foil when the latter encounters an obstruction that increases the loading of the foil above a predetermined limit. Then, after the foil has passed over the obstruction, it is returned quickly to the normal operating position. In this instance, the load limiting means comprises a separate hydraulic actuator 174 (Figs. 20, 22, and 28) of the piston type interposed between the bell crank arm 173 and a bracket 175 secured to the steering knuckle block 141. The cylinder 176 of this actuator is fulcrumed on the bracket and the downwardly projecting piston rod 177 is coupled by a pin 178 to the free end of the bell crank arm 173. As will appear later, pressure fluid is admitted continuously to the rod end of the cylinder 176 thus urging the piston 179 upwardly, the bell crank 165 and therefore the hydrofoil will, under such pressure, be lowered back to normal operating position, determined by engagement of the piston 179 with the head of its cylinder 176.

The yield point of the load limit actuator is determined by a relief valve 180 (Fig. 28) herein interposed in a conduit 181ª and controlling the escape of fluid from the cylinder and out through the conduit end 181. The valve is loaded by a suitable spring 180ª which determines the point at which the valve will open under the abnormal pressure created in the rod end of the cylinder 176 by an obstructing force transmitted to the piston 179 through the crank arm 161 and the bell crank 165. After the hydrofoil has yielded and passed over the obstruction, the valve 180 will close automatically, and the continued supply of pressure fluid to the cylinder 176 will return the piston 179 to the head end and the hydrofoil to normal operating position.

Means is preferably provided for supplementing the action of the load limiting actuator 174 so that the front hydrofoils will be held in operating position in the event of failure of the pressure supply. This means may comprise a shear pin 172 (Figs. 20 and 27) extending parallel to the folding axis through an arm 173 of the bell crank 165 and the knuckle block 141. The pin thus acts through the bell crank and the abutting lugs 170 and 171 to hold the hydrofoil against backward turning under the normal load exerted on the submerged part of the foil by the water and small passing objects such as weeds. When the load imposed on the hydrofoil is sufficient to overcome the resistance offered by the energized actuator 174 and the pin 172, the latter is sheared and the foil is free to swing backwardly and upwardly against the resistance exerted by the hydraulic actuator and thus ride over the obstruction.

*Hydraulic circuits and operation.*—To swing the hydrofoil about the tube axis 53 between the operating (Figs. 19 and 20) and retracted (Fig. 24) positions and to maintain the load limit actuator 174 energized during normal operation, fluid placed under pressure by a suitable pump 182 (Fig. 28) within the boat is directed selectively to the cylinders 163, 166 and 176 under the control of a valve 183 having a member manually movable as by a hand knob 184 and closed when the knob is in a neutral position. The delivery pressure of the pump is determined by a spring loaded by-pass valve 185 and a lower back-pressure is maintained in the various hydraulic actuators by interposing a spring loaded relief valve 186 in the return line to the pump.

To insure retention of the pressure fluid in the load limiting cylinder 176 until the relief valve 180 is opened by the increased load imposed by an obstruction, the by-pass valve 185 is disabled against a backward flow of fluid therethrough from the cylinder 176. This is accomplished by interposing in the line 192 a check valve 192ª which prevents a reverse flow of the pressure fluid from the valve 183 back toward the pump and the by-pass valve 185.

Preferably, though not necessarily, the conduits for conveying fluid to and from the different actuators are mostly concealed within the actuators and the supporting structure of the hydrofoil. This may be accomplished by employing hollow rods for the different pistons and transfer rings of well known construction between the relatively rotatable parts of the pivotal connections including the kingpin 152, the cross-tube 49 of the foil, the trunnions of the cylinders and the pivot pins of the piston rods. Typical of such transfer rings is that shown in Figs. 25 and 26 between the hollow piston rod 168 and the bell crank lever 165. A passage 187 on the latter opens into the hollow pin 169 having a port that registers with a transfer ring 188 at the end of the hollow piston rod 168 whose passage 168a is extended through a hole 189 (Figs. 25 and 34) in the piston 189a. Similarly, fluid passages along the trunnions of a pivotally mounted cylinder may be arranged as shown in Fig. 34. These transfer rings 219 and 204 are formed in the ends 157 of the arm 158 which form the trunnion bearings for the cylinder, these communicating through the hollow trunnions 167 with the cylinder 166 or some other passage movable therewith. Transfer rings of similar construction are provided at various other joints as shown in Fig. 27 and diagrammatically in Fig. 28.

In operation of the foil folding actuators 155 and 156, pressure fluid will be admitted to the rod ends of the cylinders 163 and 166 when the valve 183 is shifted from the "unfold" position as shown in Fig. 28 to the "fold" position. The fluid circuit then extends from the pump outlet 192 through the valve 183, a conduit 193, transfer rings 194 around opposite ends of the kingpin 152, a passage 195 through the frame 149, a flexible hose 196 (Fig. 20), a transfer ring 197 (Figs. 27 and 28) in the bearing 140, a passage 198 within the cross-tube 49 of the hydrofoil and the arm 161 thereon, a transfer ring 199, the piston rod 159 and a hole 200 to the rod end of the cylinder 163. The connection is extended to the rod end of the cylinder 166 through the pipe 201, a transfer ring 202 around one trunnion 164, a conduit 203 on the arm ends 157, a transfer ring 204 (Figs. 28 and 34) in one of the trunnions 167 and a pipe 205 along the cylinder 166. A similar and parallel circuit extends from a branch 209 of the pressure line 193 to the cylinders 163, 166 of the front hydrofoil on the other side of the boat.

With fluid at the high pressure applied to the rod ends of the cylinders 163 and 166 when the hydrofoils 10 are unfolded or in normal operating position, the hydrofoils will be urged counterclockwise as viewed in Fig. 20, and, as the cylinders 163 and 166 move inwardly relative to their pistons 162, 179, each hydrofoil will be swung forwardly and upwardly. At the midpoints in the strokes of the actuators, the parts will be positioned as shown in Fig. 22. At the ends of the piston strokes, the arm 158 and the cylinders 163 and 166 will be disposed in upright position as shown in Figs. 24 and 25. During such folding of the hydrofoils, fluid is forced out of the head ends of cylinders and through a circuit now to be described.

When the valve 183 is moved to the "unfold" position, the conduit 193 is connected to the return line 210 leading back to the sump through the back pressure control valve 186. At the same time, pressure fluid is delivered to a line 211 which is connected to the head ends of the cylinders 163 and 166 and to the rod end of the load limiting cylinder 176. The circuit extends through transfer rings 212, a passage 213, a hose 214, a transfer ring 215, a conduit 216, transfer ring 217, the pivot stud 169, a transfer ring 218 to the rod 168 and through the passage 189 in the piston 189a. From the head end of this cylinder 166, the fluid connection is extended through one trunnion 167 (Fig. 34) and transfer rings 219, 220 interconnected by a line 203a (Figs. 25 and 28) to the head end of the cylinder 163. High pressure is applied to the hydrofoil on the other side of the boat through a similar circuit extending from a branch 221 of the line 211.

At the same time, high pressure fluid is delivered to the rod end of the load limiting cylinder 176 through a transfer ring 221 around the pin 178 and to the hollow rod 177 having a hole 208 that communicates with the rod end of the cylinder. The actuator 174 is thus energized and acts to hold the bell crank 165 and the stop 171 in fixed position under normal loading of the hydrofoil. A check valve 216a (Fig. 28) in the branch line 218a prevents the escape of fluid from the cylinder 176 through the line 216 at all times.

Upon such application of high pressure fluid to the head ends of both cylinders 163 and 166 with the hydrofoil in upright or folded position (Fig. 24), the cylinders are forced outwardly along their pistons and thus swing the arm 158 and the hydrofoil clockwise about the axis 53 and back to the normal operating position (Fig. 20) determined by engagement of the lug 170 with the stop 171. In this movement fluid in the rod ends of the cylinders is forced back to the sump through the passage first described and the relief valve 186.

The folded positions of hydrofoils will be maintained after operation of the pump is discontinued. To this end, the valve is moved to the "neutral" position thereby closing the conduits 193 and 211 and therefore the passages leading to the different actuators.

Hydraulically actuated means is also employed for swinging the hydrofoil supporting frame 149 of the front hydrofoils horizontally between the operating position shown in Fig. 20 and the folded position (Fig. 24) alongside the boat. This means is divided into two parts one comprising a cylinder 224 fulcrumed near its rod end on a pivot stud 225 upstanding from the lower member 148 of the frame at a point spaced from the upright folding axis 153. A piston 226 slidable in this cylinder is on a hollow rod 227 pivotally connected by a hollow pin 228 to an arm rigid with the bracket 151 and projecting outwardly and rearwardly therefrom. With the hydrofoil in normal operating position (Figs. 20 and 23), the piston rod 227 is inclined at about thirty degrees relative to the frame 149 which then projects outwardly at right angles from the boat. At that time, the piston 226 is at the rod end of the cylinder 224.

The other actuator comprises a piston 229 slidable in a cylinder 230 (Figs. 20 and 22) whose head end is pivoted on trunnions 231 carried by the rear end of a bracket 232 extending along and secured to the side of the boat a substantial distance behind the main bracket 151. The piston 229 is on a rod 233 pivoted at 234a near one end of a link 235 comprising two rigid parts whose ends 236 abut each other when the link is straightened (Fig. 20) and which are pivotally connected by a pin 234 offset laterally a short distance from the axis of the link when the latter is straightened. As a result, the parts of the link remain in abutment when the straightened link is under longitudinal compression. The resulting joint is however broken and the parts fixed relative to each other when the actuator 229, 230 is energized to exert a rearward pull on the pivot 234a.

One part of the link is pivoted at 237 on the outer free end of the frame 149 while the other part is fulcrumed on a pin 238 on a block 239 fixed to the bracket 232 and curved as indicated at 240 to provide a stop in which the free end of the frame becomes seated when swung into folded position alongside the boat as shown in Fig. 24. The pivots 231 and 234a are so located that the piston rod 233 lies outside of the pivot 238. As a result, the admission of pressure fluid to the rod end of the cylinder 230 causes a pull on the pivot 234a thereby swinging the inner rod of the link clockwise as viewed in Fig. 20 to first bend the joint of the link and then swing the frame rearwardly during the remaining stroke of the actuator. Completion of the quarter revolution of the frame 149 is effected by the actuator 224, 226, the frame coming to rest in the seat 240 as shown in Fig. 24.

When the diagonally extending link is straightened as shown in Fig. 20, it effectually braces the frame 149 and sustains the full backward thrust exerted on the submerged hydrofoil as the latter moves through the water.

The two actuators 224, 226 and 229, 230 for folding both of the front hydrofoils horizontally are energized substantially simultaneously with the actuators 155, 156 above described to effect the retraction and folding of the foils. For this purpose, the rod ends of the cylinders 224 and 230 are connected (see Fig. 28) in parallel with each other and with the rod ends of the cylinders 163 and 166. One connection is from the passage 195, a suitable transfer ring (not shown) around the stud 225. The other connection extends from the conduit 193, through a transfer ring 242 around one of the trunnions 231 and to a pipe 243 alongside the cylinder 230. Similarly, the head end of this cylinder is connected to the conduit 211 through a branch line and a transfer ring 244 around the other trunnion 231. The line 211 also communicates with the head end of the cylinder 224, through a transfer ring around the stud 228, the hollow rod 227, and a hole 245 through the piston 226.

With this arrangement, pressure fluid is delivered through the line 211 to the head ends of the cylinders 224 and 230 when the valve 183 is in the "unfold" position. The frame 149 is thus swung forwardly and held under pressure in the limit and operating position shown in Fig. 20. The backward thrust exerted by the water on the moving hydrofoil is sustained by the straightened link 235 which remains in the over-center position with the ends 236 in abutment. Upon reversal of the valve to the "fold" position, the upward swinging of the hydrofoil by the actuators 155 and 156 as above described is accompanied by the admission of pressure fluid from the line 193 to the rod ends of the cylinders 224 and 230 whereupon the link 235 is flexed and the combined motions of the actuators are applied to swing the frame 149 rearwardly and alongside the boat until the frame comes against the seat 240 as shown in Fig. 24.

*Incidence angle adjustment.*—Variation in the angle of incidence while the hydrofoil is in operating position is effected by adjusting the angular position of the knuckle supporting member 143 about the horizontal axis 145. To this end, an arm 247 (Figs. 20 to 23) fast on the inner end of the member projects upwardly along the upright folding axis 153 to a point above the upper end of the kingpin 152. The free end of this arm is pivotally connected to a rod 248 reciprocable endwise back and forth along a path extending across and intersecting the axis 153. Herein this rod comprises two parts alined with each other and bifurcated at their ends for connection by universal couplings 248ᵃ (Fig. 23) with at least one short link 249 which is intersected by the axis 153 in all of the different positions of incidence of the hydrofoil. One end of the universal coupling 248ᵃ is fixed to the free end of the upstanding arm 247 while the other rod end of the cupling is fixed to the rod 248 which is threaded into a nut 250 (Fig. 21) journaled in a bearing 251 rigid with the bracket 151 and spaced along the boat behind the axis 145. By turning the nut in the opposite directions when the foil is in normal operating position, it will be apparent that the screw will be advanced endwise in a corresponding direction to rock the arm 247, and the adjusting member 143 about the horizontal axis 145. The effective angle of incidence of the active or submerged part of the hydrofoil is thus changed in accordance with the extent of turning of the nut 250.

The double universal pivot joint thus provided in the connection to the incidence adjusting arm 247 is always adapted to flex in a horizontal direction irrespective of the prevailing angular position of the incidence adjusting arm 247. Because of this and the location of the joint for intersection with the folding axis 153 in all degrees of variation of the incidence angle, the joint will flex as shown in Fig. 22 and permit the hydrofoil unit to be swung around and folded against the side of the boat. The construction for adjusting the incidence angle remains intact during folding and unfolding of the hydrofoil unit.

Adjustment of the incidence angle may be effected manually from a point of control within the boat. For this purpose, a sprocket 252 (Figs. 20, 21 and 29) is fast on the nut 250 within the hollow end portion of the bracket 151 which has a side opening through which an endless chain 253 on the sprocket may be extended into the boat. Within the latter, the chain meshes with a sprocket 254 on a shaft 255 which may by turning a hand crank 256, be rotated in opposite directions to correspondingly turn the nut and thereby rock the arm 247, the steering knuckle 142, and the hydrofoil carried thereby about the axis 145. The incidence angle of the active submerged part of the hydrofoil is thus changed slowly and in proportion to the extent of turning of the crank 256.

*Steering front foils.*—As in the system first described, the boat is steered by turning the two front foils 10 about their axes 54 without detracting from the foldability of each foil and with provision for over-steering to equalize the loading on the two foils. To these ends, an upright rockshaft 258 (Figs. 20 and 29) extends through the side of the boat and is journaled intermediate its ends in a bearing 259 on a bracket 260 which is bolted to the outside of the boat a short distance behind the main bracket 151. Within the boat, an arm 261 (Fig. 29) fast on the upper end of the rockshaft projects inwardly and is coupled through a yoke 262 with a nut 263 threaded onto a screw 264 suitably journaled on the boat frame. Through bevel gears 265 and sprockets 266 meshing with and joined by a chain, the screw shaft is coupled with a hand wheel 267 mounted within the boat and adapted to be rotated back and forth to steer the boat.

Outside of the boat, the lower end of the rockshaft 258 carries an arm 268 projecting horizontally and forwardly and connected by a pivot 269 at its free end with one end of a link 270. The latter extends outwardly along the under side of the frame 149 and near the outer end of the latter is joined at 271 to the free end of an arm 274 rigid with the hydrofoil bearing sleeve 140 and projecting rearwardly from the latter. Through the linkage thus formed, the hydrofoil is swung back and forth about the steering axis 54 in accordance with the turning of the steering wheel 267. This motion is transmitted to the rockshaft 258 on the other side of the boat through arm 272 rigid with and projecting rearwardly from the lower ends of the two rockshafts and pivotally connected outside of the boat to opposite ends of a link 273. The latter extends across the boat through openings in opposite sides of the hull.

To permit retraction and folding of the front hydrofoils as above described without disconnecting or otherwise intefering with the steering linkage, the lengths of the arms 268 and their angular positions on the rockshafts 258 are so chosen that, in the straight-ahead position of the steering wheel 267, the pivots 269 will be alined vertically with the folding axes 153. Thus, the arms 274 and the links 270 are adapted to swing around the axis 153 with the frame 151 and the hydrofoil unit thereon while the rockshafts and the arms 268 remain stationary.

*Oversteering.*—In this modification a somewhat different and simplified arrangement of the steering linkages is employed to effect oversteering when negotiating a turn so as to equalize the steering load. As illustrated in Fig. 30, each linkage includes the link 270 and the arms 268 and 274 which are of substantially equal lengths and respectively fulcrumed on the axis 258 and the parallel steering axis 54 which axes, as before, are spaced apart a distance somewhat greater than the length of the link connecting their free ends 269 and 271. By virtue of this relation and the projection of the arms in opposite directions from their axes, the desired differential swinging of the two front hydrofoils is achieved.

Assuming that the linkage shown in Fig. 30 is for the right front hydrofoil, it will be observed that during turning of the arm 268 through an angle x to swing the hydrofoil 10 clockwise and make a right turn, the angle r decreases while the angle *s* increases. As a result, the pivot 269 is shifted a lesser distance away from the original position of the link than the pivot 271. This necessitates movement of the arm 274 through an angle *x'* which is greater than the angle *x* by an angle *z*. Similarly, when the arm 268 is swung clockwise through an angle *y* to make a left turn, the pivot 271 is shifted a shorter distance away from the original position of the link than the pivot 269 and, as a result, the arm 274 swings through an angle *y'* which is smaller than the angle *y* by an amount *t*. Thus for a given angular displacement of the arm 268 in opposite directions away from the straight ahead position, the right foil is turned farther by the amount *z*, in making a right turn, and a lesser angle *t* in making a left turn. As a result, in making a right turn, the right hand foil is turned more than the left hand foil by an amount equal to the sum of the angles *z* plus *t*.

*Automatic incidence angle adjustment.*—The modified arrangement for adjusting the incidence angle of the front hydrofoils lends itself readily to adjustment as described above automatically as an incident to steering so as to minimize the effect of the resulting centrifugal force on the stability of the boat. For this purpose, it is only necessary to couple the sprockets 254 (Fig. 29) of the two foils 10 properly to the screw shaft 264 which, as above described, is turned back and forth by the steering wheel 267 to turn the boat to the right or left. Herein the coupling is effected by an endless chain 276 meshing with a sprocket 277 coupled through the bevel gearing 265 to the shaft 264 and a sprocket on the shaft 278 carrying the sprocket 254. Through a suitable mechanism such as that shown in Fig. 8, the sprocket 254 and the crank 256 are normally coupled to a disk 279 fast on the shaft 278 but may be disconnected as by retraction of the crank when it is desired to adjust the angle of the particular hydrofoil manually.

The shaft 278 is coupled as by an endless chain 280 to the corresponding shaft associated with the other front hydrofoil through a second chain 253. This incidence angle of this foil may also be adjusted manually and individually through a second disengageable crank 256.

*Rear foil mounting and actuation.*—For certain types of boats having two front hydrofoils and capable of being steered by adjusting such foils, substantial simplification in the overall system may be achieved by employing only one hydrofoil at the stern of the boat mounted and actuated as illustrated in Figs. 31 to 33. This foil, indicated generally at 283, has a greater width than the front foils 10 above described and is preferably U-shaped to provide a horizontally disposed foil section 284 of substantial length. In addition to connection of the end of this foil to the end of the cross-tube 49, additional vertical struts 285 of foil cross section join the tube with the intermediate and active part of the foil. The cross-tube is journaled in bearings 286 in flanged brackets bolted to the stern 56 of the boat.

The rear foil is maintained in upright operating position (Fig. 32) or swung backwardly and upwardly out of the water by two hydraulic actuators 287 and 288 similar to the actuators 155 and 156 above described. Herein the cylinder 289 of the actuator 287 is fulcrumed near its rod end on trunnions 290 on the rearwardly projecting forked arm 291 loose on the cross-tube 49 of the hydrofoil near the center line of the boat. The rod 292 of the piston 292a projects forwardly and downwardly and is joined at a pivot 293 with the free end of an arm 294 fast on the cross-tube 49 and depending from the latter in the operating position of the foil (Fig. 32).

Herein, the other actuator 288 is disposed inside the boat with the head end of its cylinder 295 pivoted at 296 on a forwardly extending arm 297 also loose on the tube 49. The piston rod 298 extends through an opening in the stern of the boat and is pivoted at 299 on an upright extension of the arm 291 and behind the cross-tube of the foil.

The angle of incidence of the foil may be adjusted through suitable means such for example as a rockshaft 300 having an eccentric pin 301 thereon connected by a link 302 to the forward end of the arm 297. Such turning of the shaft rocks the entire assembly including the two energized actuators thus correspondingly changing the incidence angle of the hydrofoil. Rocking of the shaft may be effected by turning a shaft 303 (Fig. 33) extending to a desired control position within the boat and coupled as by bevel gearing to the rockshaft 300.

High pressure fluid may be supplied to the actuators 287 and 288 from the pump 182 and under the control of the valve 183 above described. The connections to opposite ends of the cylinders 289 and 295 may be through flexible hoses (not shown). In this instance, the pistons 292a and 295a are sized so that, under the available fluid pressure, the hydrofoil will be held in normal operating position against the backward thrust exerted thereon by the passing water. With such an arrangement, release of the foil in response to engagement with an obstruction may be effected by releasing fluid from one of the cylinders by means of a spring loaded relief valve associated with the cylinder the same as in the case of the actuator 174 described above.

Modification, Figs. 35 to 37

*Automatic incidence angle adjustment.*—The adjustment of the incidence angle of the different hydrofoils automatically as an incident to turning the boat may be also achieved as illustrated in Figs. 35 to 37 with only a slight alteration of the hydrofoil mountings and by omitting the separate incidence angle adjusting mechanism above described. This consists in modifying the parts of the steering knuckle 142 as described above so as to incline the steering axes 54 slightly away from the vertical and through an angle *n* on the order of five degrees. The axes on opposite sides of the boat are canted in opposite directions and converge downwardly relative to each other. These axes may intersect the axis 53 at the center of the hydrofoil tube 49 (see Fig. 36) or be disposed slightly ahead this center when the hydrofoil is mounted to provide a caster effect. With this arrangement, it will be apparent that the lines 304 through the apex of each hydrofoil and the folding axis 53 will, in response to turning of the hydrofoil above the steering axis 54, describe part of a cone 305 centered on the axis 54 with its base inclined relative to the horizontal as shown in Fig. 35.

Now, for a given normal incidence angle, the lines 304 of the right and left hydrofoils will be disposed at points 306 and 307 when the boat is moving straight ahead. If, by actuation of the steering wheel 267 to make a left turn, the foils are, by the linkages above described, turned counterclockwise to the positions shown in phantom, the center line of the right foil will be moved forwardly through the angle *o* to the position 308 (Figs. 36 and 37) while the center line 304 of the left foil will be swung rearwardly to the point 309 through an angle *p*. From Fig. 36, it will be apparent that such swinging of the foils about the canted steering axes results in increasing the incidence angle of the right foil and correspondingly decreasing the agle of the foil on the left side of the boat thus producing the desired decrease in the lifting force exerted by the foil on the inside of the turn. It will be apparent that the amount of the change in the incidence angle produced by a given turning of the steering wheel may be selected as desired by adopting a corresponding magnitude for the angle *n*.

This application is a continuation-in-part of my copending application Serial No. 327,224, filed December 22, 1952, now abandoned.

I claim as my invention:
1. A hydrofoil system for a boat having, in combina- tion, pairs of front and rear hydrofoils, means adapted to be mounted on each side of a boat hull at the bow thereof for suspending and supporting said front hydrofoils for adjustment about laterally spaced upright axes and also for adjustment about individual horizontal axes extending transversely of said hull, means adapted to be attached to the stern of said hull and suspending and supporting said rear hydrofoils for adjustment about a horizontal axis extending transversely of said hull, a steering member mounted on said hull and movable in opposite directions, connections between said member and each of said front hydrofoils and operable when turned in opposite directions to swing said front hydrofoils about said upright axis and steer the boat in a corresponding direction, and other connections between said member and said four hydrofoils operable during turning of the latter to tilt each of said hydrofoils about said horizontal axes to increase the angle of incidence of the foils on the outside of the turn while correspondingly decreasing the angle of the inside foils.

2. A hydrofoil system for a boat having, in combination, pairs of front and rear hydrofoils, means mounted on each side of a boat hull at the bow thereof for suspending and supporting said front hydrofoils for adjustment about laterally spaced upright axes and also for adjustment about individual horizontal axes extending transversely of said hull, means attached to the stern of said hull and suspending and supporting said rear hydrofoils for adjustment about a horizontal axis extending transversely of said hull, a steering member mounted on said hull and movable in opposite directions, and connections between said member and each of said hydrofoils and operable when turned in one direction to swing said front hydrofoils about said upright axes and cause the boat to turn to the left while simultaneously tilting said hydrofoils about said horizontal axes to increase the angle of incidence of the front and rear right hand foils while correspondingly decreasing the angle of the front and rear left hand foils.

3. A hydrofoil system for a boat having, in combination, a pair of hydrofoils, means adapted to be mounted on each side of a boat hull for suspending and supporting said hydrofoils for adjustment about laterally spaced upright axes and also for adjustment about individual horizontal axes extending transversely of said hull, a steering member mounted on said hull and movable in opposite directions, and connections between said member and each of said hydrofoils and operable when turned in one direction to swing said hydrofoils about said upright axis and cause turning of the boat to the left while simultaneously tilting said hydrofoils about said horizontal axes to increase the angle of incidence of the right hand foil while correspondingly decreasing the angle of the left hand foil.

4. A hydrofoil system for a boat having, in combination, a pair of hydrofoils, means adapted to be mounted on each side of a boat hull for suspending and supporting said hydrofoils for adjustment about laterally spaced upright axes and also for adjustment about individual horizontal axes extending transversely of said hull, a steering member mounted on said hull and movable in opposite directions, connections between said member and each of said hydrofoils and operable when turned in opposite directions to swing said hydrofoils in corresponding directions about said upright axes to turn the boat, and connections between said hydrofoils and said steering member operable by turning of the latter to turn the boat to tilt said hydrofoils about said horizontal axes to increase the lifting force on the outside foil and correspondingly decrease the lifting force on the inside foil.

5. A hydrofoil system for a boat having, in combination, a pair of hydrofoils, means mounted on said boat and supporting said hydrofoils for adjustment about upright axes spaced outwardly from the boat on opposite sides thereof, said means also adapting at least one of the hydrofoils for individual pivotal adjustment about a horizontal axis extending transversely of the boat whereby to vary the lifting force exerted on such foil, a steering member mounted on the boat and movable in opposite directions, connections between said member and said hydrofoils and operable when turned in opposite directions to swing the hydrofoils in corresponding directions for turning the boat, and mechanism connecting said member and said horizontally adjustable foil to adjust the latter about said horizontal axis in a direction to increase the lifting force on the outside foil relative to that exerted on the foil on the inside of the turn.

6. A hydrofoil system for a boat having, in combination, pairs of front and rear hydrofoils, means adapted to be mounted on each side of a boat hull at the bow thereof for suspending and supporting said front hydrofoils for adjustment about laterally spaced upright axes, means adapted to be attached to the stern of said hull and suspending and supporting said rear hydrofoils for adjustment about a horizontal axis extending transversely of said hull normal to the longitudinal axis thereof, a steering member mounted on said hull and movable in opposite directions, connections between said member and each of said front hydrofoils and operable when turned in opposite directions to swing said front hydrofoils about said upright axis and steer the boat in a corresponding direction, and other connections between said member and said rear hydrofoils operable during turning of the latter, to tilt the latter hydrofoils about said horizontal axis to increase the angle of incidence of the foil on the outside of the turn while correspondingly decreasing the angle of the inside foil.

7. In a hydrofoil boat, the combination of, a rigid tube extending through and anchored in the bow of the boat, a pair of hydrofoils, means on the outer ends of said tube supporting said hydrofoils to swivel about vertical axes, a steering member mounted within the boat for movement in opposite directions, and connections extending from said member outwardly from the boat and along the end portions of said tube to said hydrofoils to turn the same in directions corresponding to the movement of said member, each of said connections including a link disposed within and extending longitudinally of the tube end.

8. In a hydrofoil boat, the combination of, rigid projections anchored in the boat and extending outwardly and laterally therefrom, a pair of hydrofoils, means on the outer ends of said projections supporting said hydrofoils to swivel about upright axes, a steering member mounted within the boat for movement in opposite directions, and connections extending from said member outwardly from the boat and along said projections to said hydrofoils to turn the same in directions corresponding to the movement of said member, each of said connections including a jointed trapezoidal linkage having sides of unequal length and operable upon movement of said member to turn the boat to swing the inside hydrofoil through a greater angle than the outside hydrofoil.

9. In a hydrofoil boat, the combination of, two hydrofoils, means attached to the boat and supporting two of said hydrofoils to swing about upright axes disposed on opposite sides of and spaced outwardly from the bow of the boat, a steering member within said boat, and connections between said member and said hydrofoils and operable upon movement of the member in opposite directions to swing the hydrofoils in corresponding directions about said axes whereby to turn the boat.

10. In a hydrofoil boat, the combination of, two hydrofoils, means attached to the boat and supporting two of said hydrofoils to swing about upright axes disposed on opposite sides of and spaced outwardly from the bow of the boat, a steering member within said boat, and connections between said member and said hydrofoils and operable upon movement of the member in opposite directions to swing the hydrofoils in corresponding directions about said axes whereby to turn the boat, said connections including means operable selectively in response to the movement of the steering member to turn the hydrofoil on the inside of the turn through a greater angle than the hydrofoil on the outer side of the boat.

11. A hydrofoil system for a boat having, in combination, a pair of front hydrofoils, means adapted to be mounted on each side of a boat hull at the bow thereof for suspending and supporting said front hydrofoils for adjustment about laterally spaced upright axes and also for adjustment about individual horizontal axes extending transversely of said hull, a steering member mounted on said hull and movable in opposite directions, connections between said member and each of said front hydrofoils and operable when turned in opposite directions to swing said front hydrofoils about said upright axes and steer the boat in a corresponding direction, and other connections between said member and said hydrofoils operable during turning of the latter to tilt the hydrofoils differentially about said horizontal axes, each of said last mentioned connections comprising two rotary parts selectively engageable in different angular positions and adapted when disengaged to permit independent adjustment of the respective hydrofoils about said horizontal axes.

12. A hydrofoil system for a boat having, in combination, front hydrofoils, means adapted to be mounted on each side of a boat hull at the bow thereof for suspending and supporting said front hydrofoils for adjustment about individual horizontal axes extending transversely of said hull, a control member mounted on said hull and movable in opposite directions, and connections between said member and each of said hydrofoils and operable when turned in opposite directions to tilt said hydrofoils simultaneously and differentially about said horizontal axes to increase the angle of incidence of one and correspondingly decrease the angle of the other, each of said connections including relatively movable parts engageable in different positions and adapted when disengaged for independent adjustment of the individual hydrofoils.

13. In a hydrofoil system for a boat, the combination of, a rigid arm anchored in the bow of the boat and projecting outwardly and laterally therefrom, a housing mounted on the outer end of said arm to swing about an upright steering axis, a bearing on said housing having a horizontal axis, a rigid hydrofoil comprising a V-shaped bar and a cross bar spanning the open end of the V and journaled in said bearing, a steering connection extending outwardly along said arm to said housing, means including a stop at the end of said connection engageable with said cross bar and operable to limit the swinging of the bar independently of said connection in one direction about said steering axis, and coacting lugs on said hydrofoil and said stop interengageable by swinging of the hydrofoil about said horizontal axis into an upright position while engaging said stop, said lugs disengaging upon reverse swinging of the hydrofoil upwardly toward the horizontal whereby to free the hydrofoil from said steering connection and permit independent swiveling thereof about said upright axes.

14. In a hydrofoil system for a boat, the combination of, a rigid arm anchored in the bow of the boat and projecting outwardly and laterally therefrom, a housing mounted on the outer end of said arm to swing about an upright steering axis, a bearing on said housing having a horizontal axis, a rigid hydrofoil journaled in said bearing and suspended from said housing, and a steering connection extending to said hydrofoil along said arm and movable relative to the latter, said connection including a coupling having parts which engage each other when said hydrofoil is in active position and which disengage as the hydrofoil is swung in said bearing upwardly toward the horizontal whereby to permit swinging of the hydrofoil about said upright axis independently of said steering connection.

15. In a hydrofoil system for a boat, the combination of, a rigid supporting arm anchored in and projecting outwardly and laterally from the bow of the boat, a housing mounted on the outer end of said arm to swing about an upright axis, a shaft journaled in said housing to turn on said axis, a second shaft projecting outwardly from said housing and journaled in the latter to turn about a horizontal axis extending transversely of the boat, gears within said housing coupling said shafts, a hydrofoil pivotally suspended from said housing to swing about an axis paralleling said horizontal axis, a crank and link connection between said second shaft and said hydrofoil operable to swing the latter upon turning of said first shaft, a third rotary shaft extending from a point of control within the boat outwardly therefrom along said arm, a bearing for said third shaft mounted on said arm, and means coupling said first and third shafts together.

16. A hydrofoil system for a boat having in combination, a pair of hydrofoils, means on each side of the boat hull suspending and supporting said hydrofoils while submerged for adjustment about laterally spaced upright axes and also for adjustment of the incidence angles of the individual hydrofoils, a steering member mounted on said hull and movable in opposite directions away from a straight ahead position, and connections between said two hydrofoils and said steering member and operable by turning of the member away from said position to swing said hydrofoils in corresponding directions about said axes and also tilt the hydrofoils and increase the lifting force exerted by the hydrofoil on the outside of the turn and correspondingly decrease the lifting force of the inside hydrofoil.

17. A hydrofoil system for a boat having, in combination, a pair of hydrofoils, means on each side of the boat hull suspending and supporting said hydrofoils while submerged for adjustment about laterally spaced upright axes and also for adjustment of the incidence angles of the individual hydrofoils, a steering member mounted on said hull and movable in opposite directions away from a straight ahead position, and connections between said two hydrofoils and said steering member and operable by turning of the member away from said position to swing said hydrofoils in corresponding directions about said axes and also tilt at least one of the hydrofoils and cause the hydrofoil on the outside of the turn to exert a greater lifting force than the inside hydrofoil.

18. A bracket adapted to be attached to the side of a boat, a support projecting outwardly from said bracket and mounted thereon to turn about an upright axis, a crossbar, a hydrofoil loop rigid with and suspended from opposite ends of said bar, means on said support mounting said crossbar for swinging about a horizontal axis, fluid pressure actuated means for swinging said support about said upright axis including coacting piston and cylinder elements respectively pivoted on said bracket and support, an arm rigid with and projecting from said crossbar, fluid pressure actuated means for swinging said crossbar about said horizontal axis including coacting piston and cylinder elements pivotally connecting said arm and said support, and means selectively controlling the admission of pressure fluid to opposite ends of said cylinder elements to move said hydrofoil between an upright submerged operating position and an inverted folded position alongside said boat.

19. A bracket adapted to be attached to the side of a boat, a support projecting outwardly from said bracket and mounted thereon to turn about an upright axis, a crossbar, a hydrofoil loop rigid with and suspended from opposite ends of said bar, means on said support mounting said crossbar for swinging about a horizontal axis, fluid pressure actuated means for swinging said support about said upright axis, fluid pressure actuated means carried by said support for swinging said crossbar about said horizontal axis, and means selectively controlling the admission of pressure fluid to said means to move said hydrofoil between an upright submerged operating position and an inverted fold position alongside said boat.

20. The combination of, a support adapted to be attached to a boat and overhanging the latter, a crossbar journaled intermediate its ends on said support to turn about a horizontal axis, a hydrofoil fixed to and suspended from said bar for submergence of its active lower end in the water, first and second arms respectively fixed to and journaled on said bar to turn about said axis, two fluid pressure actuators extending across and disposed on opposite sides of said axis and each comprising coacting piston and cylinder elements, the elements of one pair being pivoted respectively on said support and said second arm and the other elements being pivotally connected respectively to said first and second arms, and means for controlling the admission of pressure fluid to opposite ends of each of said cylinder elements to combine the motions of said actuators and swing said bar and hydrofoil toward and away from a normal operating position in an upright plane.

21. The combination of, a support adapted to be attached to the side of a boat and overhanging the latter, a crossbar journaled intermediate its ends on said support to turn about a horizontal axis extending longitudinally of the bar, a hydrofoil loop fixed to and suspended from said bar for submergence of its active lower end in the water, first and second arms respectively fixed to and journaled on said bar to turn about said axis, two fluid pressure actuators each comprising coacting piston and cylinder elements, the elements of one pair being connected respectively to said support and said second arm and the other elements being connected respectively to said first and second arms, and means for controlling the admission of pressure fluid to said cylinder elements, a lug on said fixed arm, an abutment engaging said lug when said hydrofoil is in a normal upright operating position, and means normally holding said abutment fixed to said support and thereby sustaining the normal water thrust on the hydrofoil.

22. The combination of, a support adapted to be attached to the side of a boat and overhanging the latter, a crossbar journaled intermediate its ends on said support to turn about a horizontal axis extending longitudinally of the bar, a hydrofoil fixed to and suspended from said bar for submergence of its active lower end in the water, first and second arms respectively fixed to and journaled on said bar to turn about said axis, mechanism for swinging said hydrofoil forwardly and upwardly through a quarter revolution from a normal upright position comprising two fluid pressure actuators one acting between said support and said second arm and the other elements acting between said first and second arms, means for controlling the admission of pressure fluid to opposite ends of each of said cylinder elements, two lugs rigid with said first arm and said support respectively and adapted for abutting engagement when said hydrofoil is in said normal position, and selectively operable means for adjusting the angular position of said support and the lug thereon to vary the angle of incidence of said hydrofoil.

23. The combination of, a bracket adapted to be attached to a boat, an elongated arm pivoted at one end on said bracket to swing about an upright axis between a folded position alongside said boat and an operating position projecting outwardly from the boat, a link pivoted at one end on said arm near the free end thereof and extending diagonally of the arm, a second bracket adapted to be attached to the side of said boat and pivotally supporting the opposite end of said link, said link having a joint intermediate its ends permitting bending of the link in one direction from a substantially straightened condition, said link when straightened sustaining the thrust exerted by the water on said hydrofoil, and a reversible power actuator adapted when energized to flex said link and swing said arm about said axis toward and away from said folded position.

24. In a hydrofoil system carried by a boat, the combination of, an elongated frame, means on one side of the boat supporting one end of said frame for swinging of the frame about an upright axis, a member lying alongside said frame and supported thereby to swing about a horizontal second axis, a hydrofoil having a loop of foil cross section rigid with and suspended from opposite ends of a crossbar, means on said member supporting said bar to turn about a horizontal third axis paralleling and disposed adjacent said second axis, means limiting the movement of said frame and said hydrofoil about said first and third axes to a normal position in which the hydrofoil is disposed in an upright plane extending transversely of said boat, fluid pressure actuating means operable selectively to turn said crossbar about said third axis and said frame about said first axis to swing the hydrofoil both vertically and horizontally away from and back to said normal position, and means mounted on said boat and movable in opposite directions to swing said member about said second axis, said last mentioned means including a connection adapted to bend about said upright axis in all of the different positions of adjustment of the hydrofoil about said second axis.

25. The combination of, a bracket adapted to be mounted on the side of a boat, an elongated frame pivotally supported at one end on said bracket to swing about an upright axis, an elongated support lying alongside said frame and pivotally supported thereon to swing relative to the frame about a horizontal axis, an arm rigid with and projecting from said support adjacent said upright axis, and a reciprocable member extending transversely of and through said upright axis and connected to the free end of said arm, said member including a joint intersected by said upright axis and adapted during swinging of said frame about said upright axis to flex about an upright axis disposed adjacent said first upright axis, and a hydrofoil carried by said support and having an incidence angle adjusted in response to reciprocation of said member.

26. The combination of, a bracket adapted to be mounted on the side of a boat, an elongated frame pivotally supported at one end on said bracket to swing about an upright axis, an elongated support lying alongside said frame and pivotally supported thereon to swing relative to the frame about a horizontal axis, a hydrofoil carried by said support in a submerged position and having an angle of incidence adjustable by swinging of the support about said horizontal axis, and mechanism for rocking said support including a member extending transversely of and through said upright axis and having a flexible joint therein intersected by said upright axis.

27. In a hydrofoil system for a boat, the combination of, an elongated frame mounted on the boat to swing about an upright axis adjacent one side of the boat, a support mounted on said frame to swing about a horizontal axis projecting outwardly from the boat, a hydrofoil suspended from a crossbar, a bearing member supporting said bar to turn about a second axis lying adjacent and paralleling said first horizontal axis, a steering knuckle on the outer end of said support mounting said member to turn about an upright steering axis paralleling said first axis, and actuating means for swinging said hydrofoil about each of said horizontal axes and each of said upright axes.

28. In a hydrofoil system for a boat, the combination of, an elongated support mounted on the boat to swing about an upright axis adjacent one side of the boat, a hydrofoil suspended from a crossbar, a bearing member supporting said bar to turn about its longitudinal axis, a steering knuckle on the outer end of said support mounting said bearing member to turn about an upright steering axis paralleling said first axis, actuating means for swinging said hydrofoil about said longitudinal axis and each of said upright axes.

29. The combination with a boat of, a hydrofoil mounted thereon to swing into and out of the water to and from a submerged operating position below the bottom of the boat, mechanism for actuating said hydrofoil including a hydraulic actuator having a piston connected to said hydrofoil and a cylinder adapted when maintained under pressure to urge the hydrofoil to and hold the same in said operating position, said actuator sustaining the thrust exerted on said hydrofoil during forward motion of the boat through the water, and means for releasing fluid from said cylinder automatically when the pressure thereof increases above a predetermined abnormal value.

30. The combination with a boat of, a pair of hydrofoils, means attached to opposite sides of said boat supporting said hydrofoils, when submerged, to swing about upright axes disposed on opposite sides of the boat and converging downwardly at small angles relative to the vertical and in a direction transversely of the boat, and means interconnecting said hydrofoils and operable to turn the same simultaneously about said axes whereby to change the incidence angles of the two automatically with the turning of said hydrofoils to steer the boat.

31. In a hydrofoil boat, the combination of, supports mounted on opposite sides of the boat, two hydrofoils respectively mounted on said supports to swing about upright steering axes spaced outwardly from the boat, a linkage system for each hydrofoil for swinging the same about its steering axis and comprising two arms one mounted to swing about said steering axis, the second being swingable about a second axis substantially paralleling and laterally spaced from the steering axis, a link pivotally joining the free ends of said arms and having a length less than the spacing of said steering and second axes, and a connection extending across the boat and joining said second arms for swinging in unison in either direction away from a normal straight ahead position.

32. In a hydrofoil boat, the combination of, a pair of front hydrofoils, a pair of rear hydrofoils, means attached to said boat at the bow and stern thereof and supporting said front and rear hydrofoils outwardly from the boat to provide four widely spaced points for supporting the boat above the water, said supporting means providing for swinging of the hydrofoils of one of said pairs about laterally spaced upright steering axes, and selectively operable means for swinging the hydrofoils of said last mentioned pair about said axes and in either direction away from a straight ahead position whereby to turn the moving boat to the right or left.

33. In a hydrofoil system for a boat, the combination of, a support mounted on the boat to swing about an upright axis adjacent one side of the boat, a steering knuckle on said support, a hydrofoil carried by said steering knuckle and swingable about an upright steering axis spaced outwardly from said first axis, a steering member within the boat movable in opposite directions away from a straight ahead position, and a connection for transmitting the motion of said member to said hydrofoil to swing the latter back and forth about said steering axis, said connection including an arm swingable about an axis fixed to said boat and substantially paralleling said first axis and a link joined to the free end of said arm by a pivot substantially alined with said first axis when said hydrofoil is in the straight ahead position.

34. In a hydrofoil system for a boat, the combination of, a support mounted on the boat to swing about an upright axis adjacent one side of the boat, a steering knuckle on said support, a hydrofoil carried by said steering knuckle and swingable about an upright steering axis spaced outwardly from said first axis, a steering member within the boat movable in opposite directions away from a straight ahead position, and mechanism for transmitting the motion of said member to said hydrofoil to swing the latter back and forth about said steering axis, said mechanism including a pivot which is disposed adjacent to said first axis when said hydrofoil is in the straight ahead position.

35. In a hydrofoil boat, the combination of, a bracket adapted to be mounted on the side of the boat, a frame projecting outwardly from the boat and pivotally supported at its inner end on said bracket to swing about an upright axis, a hydrofoil, means supporting said hydrofoil on the outer end of said frame for adjustment about a horizontal axis to correspondingly vary the effective incidence angle of the hydrofoil, and a motion transmitting connection supported by the boat for adjusting said incidence angle including an endwise reciprocable member extending transversely of and through said upright axis and including a joint adapted to bend about an upright axis disposed adjacent said first upright axis during swinging of said frame about the latter axis.

36. In a hydrofoil boat, the combination of, a shaft carrying a hydrofoil, a support adapted to be attached to said boat, bearings on said support mounting said shaft for turning through more than a quarter revolution whereby to swing said hydrofoil into and out of a submerged position, an arm fast on said shaft, a second arm loose on said shaft, a first hydraulic actuator having piston and cylinder elements respectively pivoted on said first and second arms, a second hydraulic actuator having piston and cylinder elements one pivoted on said second arm, and means pivotally connecting the other of said second elements to said support, the pivots of said first and second actuator elements paralleling the axis of said shaft.

37. In a hydrofoil boat, the combination of, a shaft carrying a hydrofoil, a support adapted to be attached to said boat, bearings on said support mounting said shaft for turning through more than a quarter revolution whereby to swing said hydrofoil into and out of a submerged position, an arm fast on said shaft, a second arm loose on said shaft, a power driven actuator having interconnected elements movable axially relative to each other, means pivotally connecting the outer ends of said elements to said first and second arms respectively, a second similar actuator, means pivotally connecting the outer ends of the elements of the second actuator to said second arm and to said support respectively, the axes of said pivotal connections paralleling the axis of said shaft.

38. A hydrofoil system for a boat having, in combination, a pair of hydrofoils one on the right side of and the other on the left side of the center line of the boat, means mounted on said boat and supporting said hydrofoils in submerged operating positions below the bottom of the boat and for individual rotation about axes extending transversely of the boat whereby to vary the incidence angles of said hydrofoils while the boat is foil borne, each of said hydrofoils having a foil element disposed at an acute dihedral angle and partially submerged when the boat is foil borne whereby to provide an effective lifting area which increases and decreases respectively with increases and decreases in the submergence of the foil in the water, a course control member mounted on the boat and selectively movable in opposite directions, a steering member submerged in the water while the boat is foil borne and swingable in opposite directions about an upright axis to change the course of the boat correspondingly, a connection between said course control member and said steering member for movement of the two in unison, a second connection between said course control member and at least one of said hydrofoils and operable to invariably determine according to the position of said course control member the incidence angle of the connected hydrofoil while the boat is foil borne, such angle adjustment being in a direction to increase the incidence angle of the hydrofoil on the outside of the turn relative to the incidence angle of the hydrofoil on the inside of the turn.

References Cited in the file of this patent

UNITED STATES PATENTS

| | | |
|---|---|---|
| 1,780,998 | Curioni | Nov. 11, 1930 |
| 2,584,347 | Hazard | Feb. 5, 1952 |